(12) United States Patent
Kang et al.

(10) Patent No.: US 10,306,540 B2
(45) Date of Patent: May 28, 2019

(54) METHOD AND APPARATUS FOR DISCOVERING NEIGHBOR NODES IN A WIRELESS COMMUNICATION NETWORK

(71) Applicant: Samsung Electronics Co., Ltd, Gyeonggi-do (KR)

(72) Inventors: Hyun-Jeong Kang, Seoul (KR); Rakesh Taori, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 13/895,203

(22) Filed: May 15, 2013

(65) Prior Publication Data

US 2013/0331097 A1 Dec. 12, 2013

(30) Foreign Application Priority Data

May 15, 2012 (KR) .................. 10-2012-0051392

(51) Int. Cl.
*H04W 48/16* (2009.01)
*H04W 4/21* (2018.01)
*H04W 8/00* (2009.01)
*H04W 4/20* (2018.01)
*H04W 84/18* (2009.01)
*H04W 40/02* (2009.01)
*H04W 40/24* (2009.01)

(52) U.S. Cl.
CPC ........... *H04W 48/16* (2013.01); *H04W 4/206* (2013.01); *H04W 4/21* (2018.02); *H04W 8/005* (2013.01); *H04W 40/023* (2013.01); *H04W 40/246* (2013.01); *H04W 84/18* (2013.01)

(58) Field of Classification Search
CPC ...... H04W 4/08; H04W 28/021; H04W 84/18
See application file for complete search history.

(56) References Cited

U.S. PATENT DOCUMENTS

| | | | |
|---|---|---|---|
| 7,697,450 B2 | 4/2010 | D'Amico et al. | |
| 7,720,037 B2* | 5/2010 | Bill ....................... | H04L 12/581 370/254 |
| 2003/0202479 A1 | 10/2003 | Huang et al. | |
| 2004/0215793 A1 | 10/2004 | Ryan et al. | |
| 2004/0260701 A1* | 12/2004 | Lehikoinen et al. ........... | 707/10 |

(Continued)

OTHER PUBLICATIONS

International Search Report dated Aug. 27, 2013 in connection with International Patent Application No. PCT/KR2013/004320, 3 pages.

(Continued)

*Primary Examiner* — Charles N Appiah
*Assistant Examiner* — Frank E Donado

(57) ABSTRACT

A method for processing a first node to configure a neighbor network in a wireless communication system including the first node and one or more second nodes neighboring the first node. The method includes generating discovery information; and broadcasting the generated discovery information to one or more of the second nodes. The discovery information includes information of the first node, an indicator indicating whether to receive the discovery information and accept the relay of the received discovery information to other nodes, and a hop limit indicating the number of available relays of the discovery information. A value of the indicator is set through an input of a user.

10 Claims, 30 Drawing Sheets

(56) References Cited

U.S. PATENT DOCUMENTS

| | | |
|---|---|---|
| 2005/0038889 A1 | 2/2005 | Frietsch |
| 2006/0133414 A1* | 6/2006 | Luoma ................. H04W 88/16 370/466 |
| 2006/0293061 A1* | 12/2006 | Kobayashi ............. H04L 45/02 455/455 |
| 2007/0026857 A1* | 2/2007 | Kotzin ................. H04W 88/06 455/426.1 |
| 2007/0104160 A1* | 5/2007 | Ho ....................... H04W 48/14 370/338 |
| 2007/0121521 A1 | 5/2007 | D'Amico et al. |
| 2007/0177554 A1* | 8/2007 | Yang ...................... H04L 67/16 370/338 |
| 2007/0286094 A1 | 12/2007 | Wigglesworth et al. |
| 2008/0031203 A1* | 2/2008 | Bill ........................ H04L 51/04 370/338 |
| 2008/0107091 A1 | 5/2008 | Ramachandran |
| 2009/0216887 A1* | 8/2009 | Hertle .................. H04L 29/125 709/227 |
| 2009/0304381 A1 | 12/2009 | Muppidi et al. |
| 2010/0208662 A1 | 8/2010 | Vilella et al. |
| 2010/0223347 A1* | 9/2010 | Van Datta ............. H04L 29/06 709/206 |
| 2010/0262717 A1* | 10/2010 | Critchley et al. ............. 709/251 |
| 2010/0302947 A1 | 12/2010 | Leppanen et al. |
| 2012/0005304 A1* | 1/2012 | Guo .................... H04L 12/1836 709/217 |
| 2012/0041806 A1* | 2/2012 | Kim ...................... G06Q 10/10 705/14.4 |
| 2012/0197988 A1* | 8/2012 | Leppanen et al. ............ 709/204 |
| 2013/0003732 A1* | 1/2013 | Dholakia ................ H04L 12/18 370/390 |
| 2013/0059606 A1* | 3/2013 | Pujol .................... H04W 4/023 455/456.3 |
| 2013/0301607 A1* | 11/2013 | McCann ........... H04W 36/0072 370/331 |
| 2015/0236984 A1* | 8/2015 | Sevier .................... H04L 49/90 370/417 |

OTHER PUBLICATIONS

Written Opinion of the International Searching Authority dated Aug. 27, 2013 in connection with International Patent Application No. PCT/KR2013/004320, 6 pages.

Extended European Search Report dated Nov. 24, 2015 in connection with European Patent Application No. 13790405.8; 8 pages.

\* cited by examiner

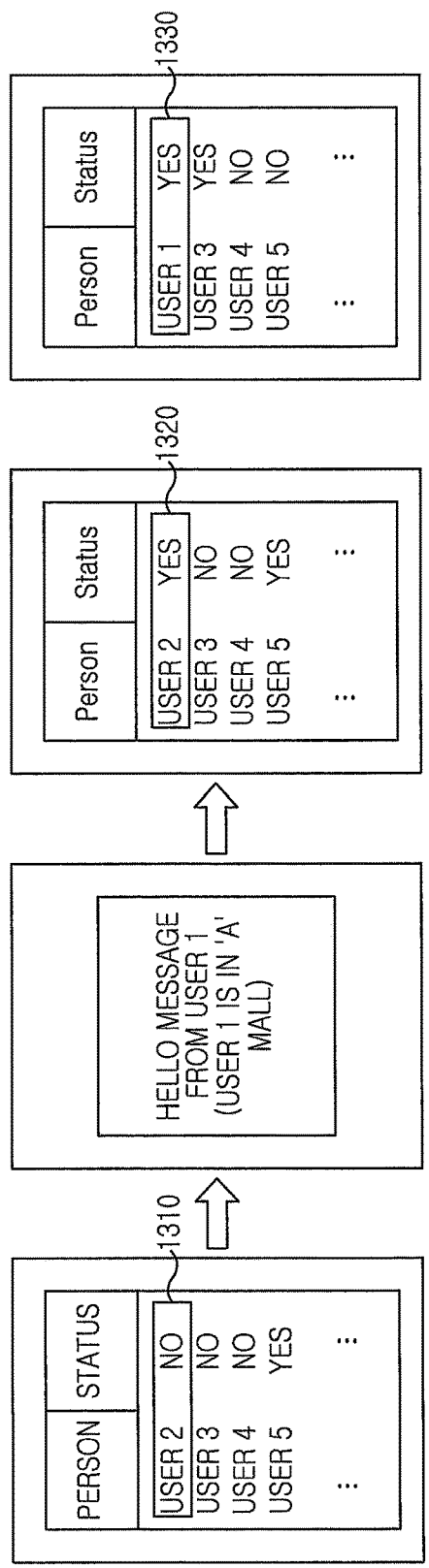

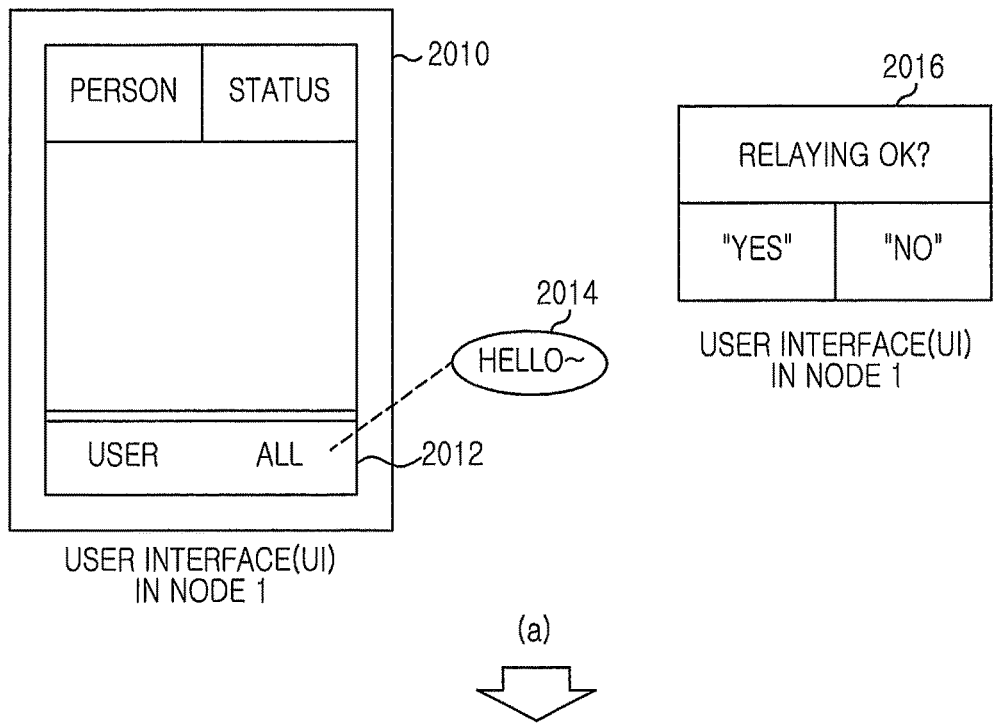
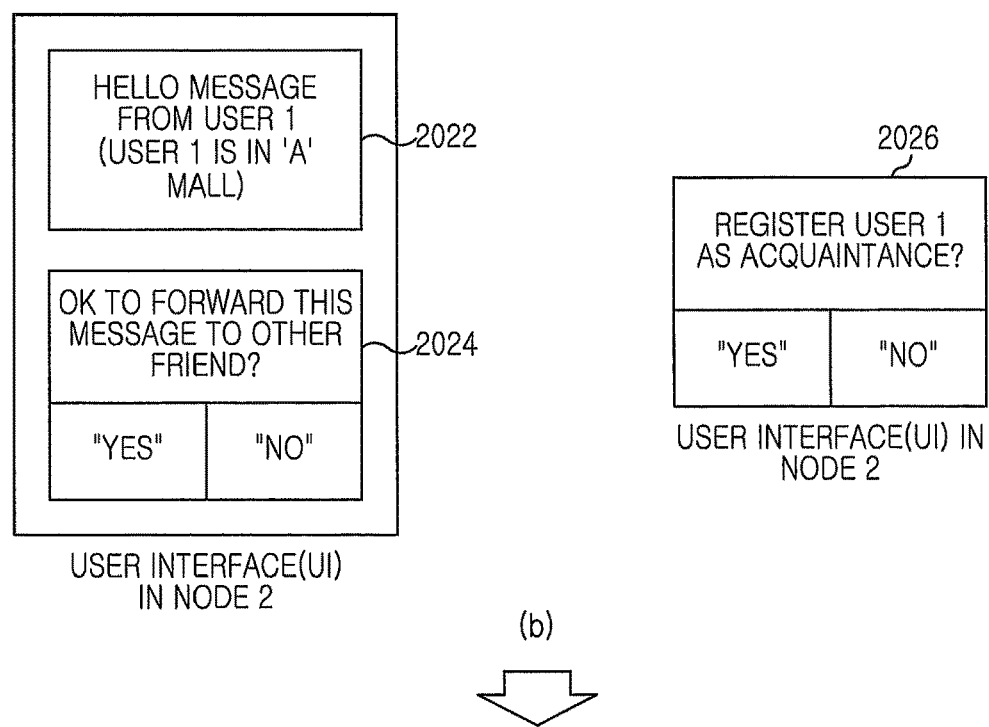
FIG.20A

METHOD AND APPARATUS FOR DISCOVERING NEIGHBOR NODES IN A WIRELESS COMMUNICATION NETWORK

CROSS-REFERENCE TO RELATED APPLICATION(S) AND CLAIM OF PRIORITY

The present application is related to and claims priority under 35 U.S.C. § 119 to an application filed in the Korean Intellectual Property Office on May 15, 2012 and assigned Serial No. 10-2012-0051392, the contents of which are incorporated herein by reference.

TECHNICAL FIELD

The present disclosure relates generally to a wireless communication network, and in particular, to a technology for discovering neighbor nodes to configure a neighbor network.

BACKGROUND

A wireless local area network (LAN) called "Wireless Fidelity" (Wi-Fi) is a wireless communication technology that enables user terminals within a predetermined range to construct a network and provide a wireless Internet service. The Wi-Fi is divided into an infrastructure mode in which an access point (AP) transmitting a wireless signal exchanges data with a plurality of user terminals within a predetermined radius in the periphery, and an ad hoc mode in which user terminals exchange data with each other by Peer-To-Peer (P2P) or Direct-To-Direct (D2D) scheme without an AP.

Such an ad hoc-mode wireless communication network includes a plurality of user terminals (nodes), and a user may discover concerned neighbor nodes such as friends, fellows, and concerned objects, and configure a neighbor network. An example of the technology for discovering neighbor nodes is a U.S. patent application titled "COMMUNICATION SYSTEM AND METHOD OF CONFIGURING A COMMUNICATION INTERFACE", which was filed on Jun. 8, 2006 by inventors Wigglesworth, Craig Douglas, et al. and was published as U.S. Patent Publication No. 20070286094 on Dec. 13, 2007. Since discovery information is processed in a Medium Access Control (MAC) layer and a network layer, U.S. Patent Publication No. 20070286094 has the limits of useless flooding of discovery information, unintended sharing of user information, and a complicated discovery protocol. What is therefore required is a new discovery scheme for solving the above limits.

SUMMARY

To address the above-discussed deficiencies of the prior art, it is a primary object to provide a neighbor node discovery apparatus and method for configuring a neighbor network in a wireless communication network including a plurality of a plurality of nodes.

Another embodiment of the present disclosure is to provide an apparatus and method for configuring a neighbor network by relaying discovery information in a wireless communication network including a plurality of a plurality of nodes.

Another embodiment of the present disclosure is to provide an apparatus and method for minimizing a change in a physical layer and a MAC layer by processing discovery information through cooperation between an application layer and a MAC layer in a wireless communication network including a plurality of a plurality of nodes.

According to an embodiment of the present disclosure, a method for processing a first node to configure a neighbor network in a wireless communication system including the first node and one or more second nodes neighboring the first node, includes: generating discovery information; and broadcasting the generated discovery information to one or more of the second nodes. The discovery information includes information of the first node, an indicator indicating whether to receive the discovery information and accept the relay of the received discovery information to other nodes, and a hop limit indicating the number of available relays of the discovery information. A value of the indicator is set through an input of a user.

According to another embodiment of the present disclosure, a method for processing a second node to configure a neighbor network in a wireless communication system including a first node and the second node neighboring the first node. The method includes: receiving first discovery information broadcast from the first node; in response to the reception of the first discovery information, inquiring of a user of the second node whether to register the first node and whether to relay the first discovery information; registering the first node when the user of the second node selects the registration of the first node; and broadcasting second discovery information to a third node neighboring the second node in response to the selection of the relay of the first discovery information by the user of the second node when an indicator included in the first discovery information indicates the acceptance of relay. The first discovery information includes information of the first node, an indicator indicating whether to receive the first discovery information and accept the relay of the received first discovery information to other nodes, and a hop limit indicating the number of available relays of the first discovery information. A value of the indicator is set through an input of a user of the first node.

According to another embodiment of the present disclosure, an apparatus of a first node includes: at least one processor; a memory; and at least one module that is stored in the memory and is configured to be executable by the at least one processor. The module includes an instruction for generating discovery information and broadcasting the generated discovery information from a first node to one or more of second nodes neighboring the first node. The discovery information includes information of the first node, an indicator indicating whether to receive the discovery information and accept the relay of the received discovery information to other nodes, and a hop limit indicating the number of available relays of the discovery information. A value of the indicator is set through an input of a user.

According to another embodiment of the present disclosure, an apparatus of a second node includes: at least one processor; a memory; and at least one module that is stored in the memory and is configured to be executable by the at least one processor. The module includes an instruction for receiving first discovery information broadcast from the first node, inquiring of a user of the second node whether to register the first node and whether to relay the first discovery information in response to the reception of the first discovery information, registering the first node when the user of the second node selects the registration of the first node, and broadcasting second discovery information to a third node neighboring the second node in response to the selection of the relay of the first discovery information by the user of the second node when an indicator included in the first discovery information indicates the acceptance of relay. The first discovery information includes information of the first node, an indicator indicating whether to receive the first discovery information and accept the relay of the received first discovery information to other nodes, and a hop limit indicating the number of available relays of the first discovery information. A value of the indicator is set through an input of a user of the first node.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 13A to 13D illustrate user screens displayed in operations according to the process flows illustrated in FIG. 12;

FIGS. 20A and 20B illustrate an example of user screens displayed on an intermediate node in a neighbor discovery operation according to another embodiment of the present disclosure.

DETAILED DESCRIPTION

FIGS. 1 through 20B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, exemplary embodiments of the present disclosure will be described in detail with reference to the accompanying drawings. In the following description, specific details are described to provide understandings of the embodiments of the present disclosure. However, it will be obvious to those skilled in the art that the present disclosure can be implemented even without the specific details. Also, it should be noted that well-known method, processes, components, circuits, and networks will not be described in detail in order not to unnecessarily obscure the subject matters of the present disclosure.

Figure 1:
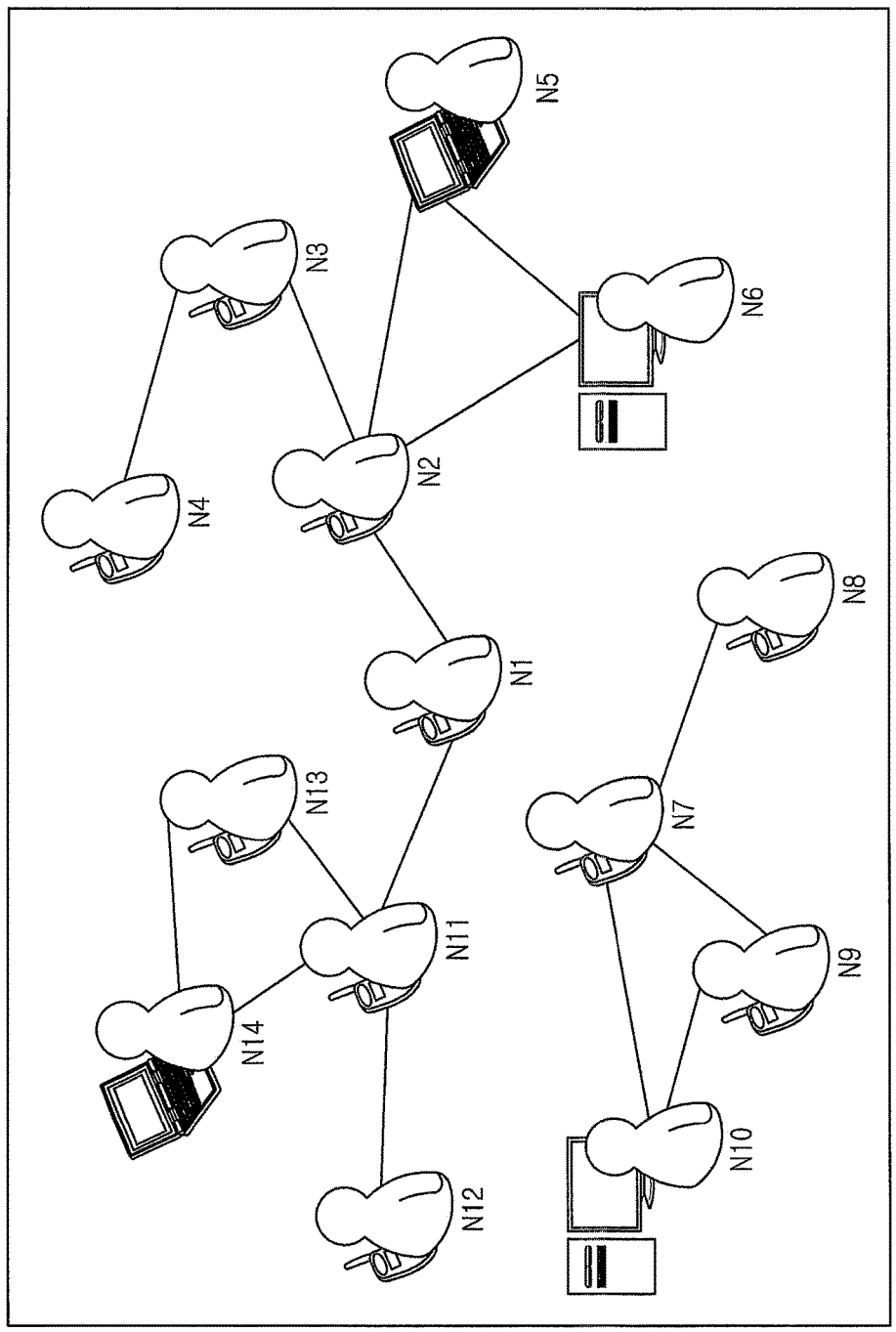
FIG. 1 illustrates an example of a configuration of a wireless communication network to which the present disclosure is applied.

The embodiments of the present disclosure described below relate to a technology for configuring a neighbor network by discovering concerned neighbor nodes (e.g., friend, fellows, and concerned objects) by a user in a wireless communication network including a plurality of user terminals (nodes) N1 to N14, as illustrated in FIG. 1. The nodes N1 to N14 may be portable electronic devices represented by reference numerals N1 to N5, N7 to N9 and N11 to N14, and may be stationary electronic devices represented by reference numerals N6 and N10. The portable electronic device may be a portable terminal, a mobile phone, a mobile pad, a media player, a tablet computer, a handheld computer, or a personal digital assistant (PDA), and may be any portable electronic device including a combination of two or more functions of theses devices.

A neighbor discovery operation according to the present disclosure described below is divided into an operation according to an embodiment that specifies a node desiring registration in a node requesting neighbor node registration (FIGS. 2A, 2B, 12 and 13), and an operation according to another embodiment that considers all nodes as nodes for registration without specifying a target node (FIGS. 3A to 3D). The operation of considering all nodes as nodes for registration may be divided into an operation in the case where some neighbor nodes are registered in a neighbor list (FIGS. 14A, 14B, 15A and 15B), and an operation in the case where no node is registered in a neighbor list (FIGS. 14A, 14B, 20A and 20B). This operation uses a relay method extending the range of a neighbor network, and is processed through cooperation between an application layer and a MAC layer. In particular, when the embodiments of the present disclosure are used in a wireless communication network such as a Wi-Fi network, it is possible to support a neighbor network while minimizing a change in the physical layer and the MAC layer. These embodiments of the present disclosure are applicable to a wireless communication network having a radius of a predefined range (e.g., up to 300 meters).

Figure 2A:
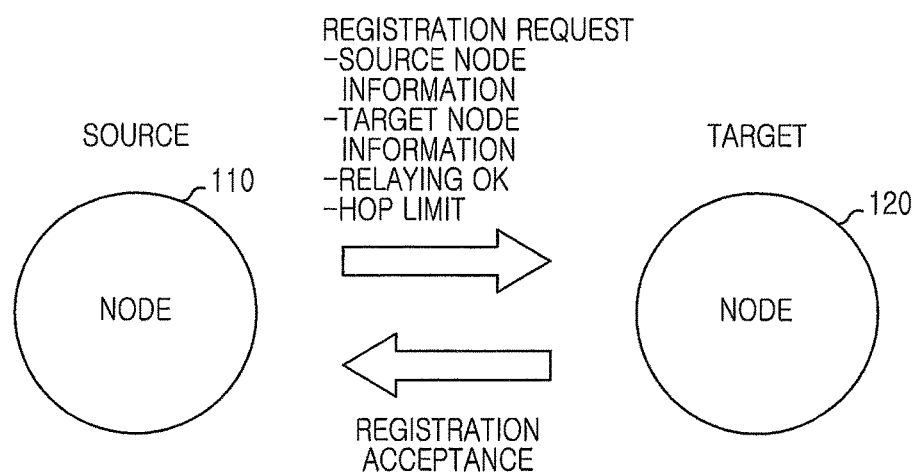
FIGS. 2A and 2B illustrate a neighbor discovery operation according to an embodiment of the present disclosure.
Figure 2B:
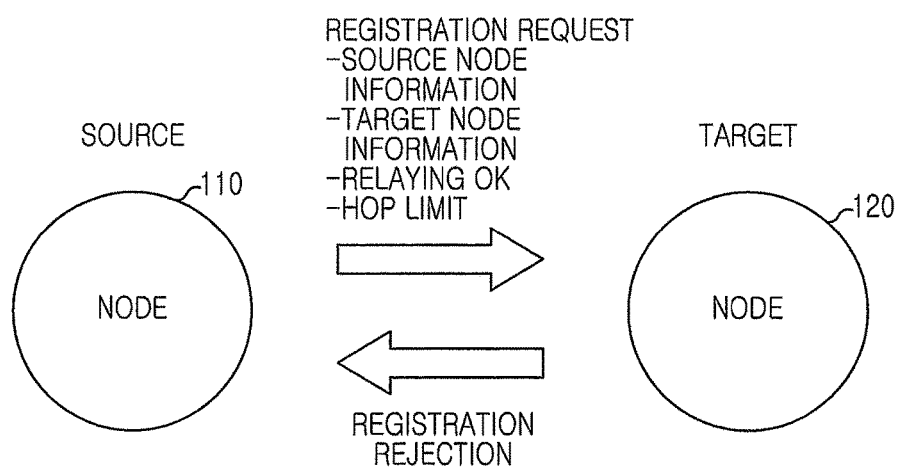

FIGS. 2A and 2B illustrate a neighbor discovery operation according to an embodiment of the present disclosure. A first node 110 as a source node requests registration by broadcasting neighbor discovery information to a second node 120 as a target node. The neighbor discovery information includes source node information, target node information, a relay acceptance/rejection indicator (Relaying OK), and a hop limit. The relay acceptance/rejection indicator is information indicating whether to accept the relay of the discovery information received to other nodes. A value of the indicator is set through a user input. The hop limit is information indicating the number of available relays of the discovery information.

The second node 120 receives the discovery information broadcasted from the first node 110. Upon receiving the discovery information, the second node 120 inquires of a user of the second node 120 whether to register the first node 110, and transmits a response message according to the inquiry result to the first node 110. For example, when the user of the second node 120 selects the registration of the first node 110, the second node 120 registers the first node 110 and transmits a response message indicating registration acceptance to the first node 110 (see FIG. 2A). On the other hand, when the user of the second node 120 does not select the registration of the first node 110, the second node 120 does not register the first node 110 and transmits a response message indicating registration rejection to the first node 110 (see FIG. 2B).

Figure 3A:
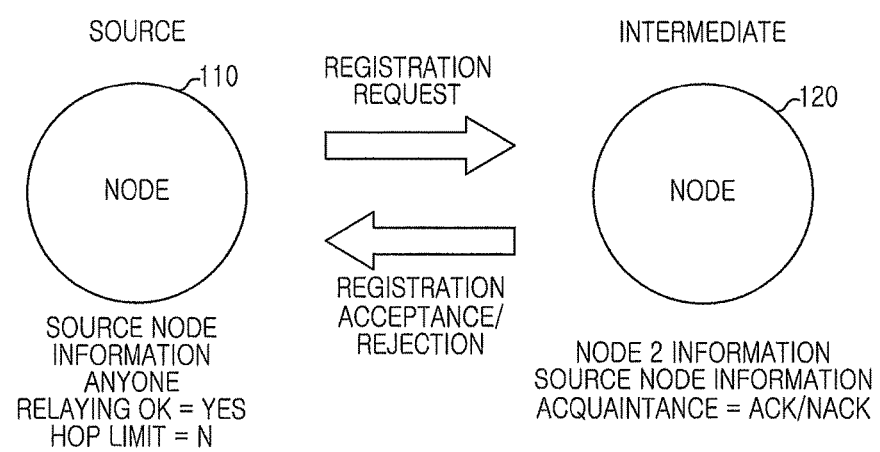
FIGS. 3A to 3D illustrate a neighbor discovery operation according to another embodiment of the present disclosure.

FIGS. 3A to 3D illustrate a neighbor discovery operation according to another embodiment of the present disclosure. Referring to FIG. 3A, a first node 110 as a source node requests registration by broadcasting neighbor discovery information to a second node 120 as an intermediate node. The neighbor discovery information includes source node information, information (ANYONE) indicating a desire to register all neighbor nodes, a relay acceptance/rejection indicator (Relaying OK), and a hop limit. The relay acceptance/rejection indicator is information indicating whether to accept the relay of the discovery information received to other nodes. A value of the indicator is set through a user input. For example, when the relay acceptance/rejection indicator is set to "YES", the indicator indicates that the relay to other nodes is accepted. The hop limit is information indicating the number of available relays of the discovery information. For example, the hop limit may be predetermined by a service provider or an operator. As another example, the hop limit may be set through a user input.

The second node 120 receives the discovery information broadcasted from the first node 110. Upon receiving the discovery information, the second node 120 inquires of a user of the second node 120 whether to register the first node 110, and transmits a response message according to the inquiry result to the first node 110. For example, when the user of the second node 120 selects the registration of the first node 110, the second node 120 registers the first node 110 and transmits a response message indicating registration acceptance to the first node 110. Herein, the response message transmitted may include information of the second node as an origination, information of the source node (first node) as a destination, and information indicating registration/non-registration (Acquaintance=ACK). On the other hand, when the user of the second node 120 does not select the registration of the first node 110, the second node 120 does not register the first node 110 and transmits a response message indicating registration rejection to the first node 110. Herein, the response message transmitted may include information of the second node, information of the source node (first node), and information indicating registration rejection (Acquaintance=NACK).

Figure 3B:
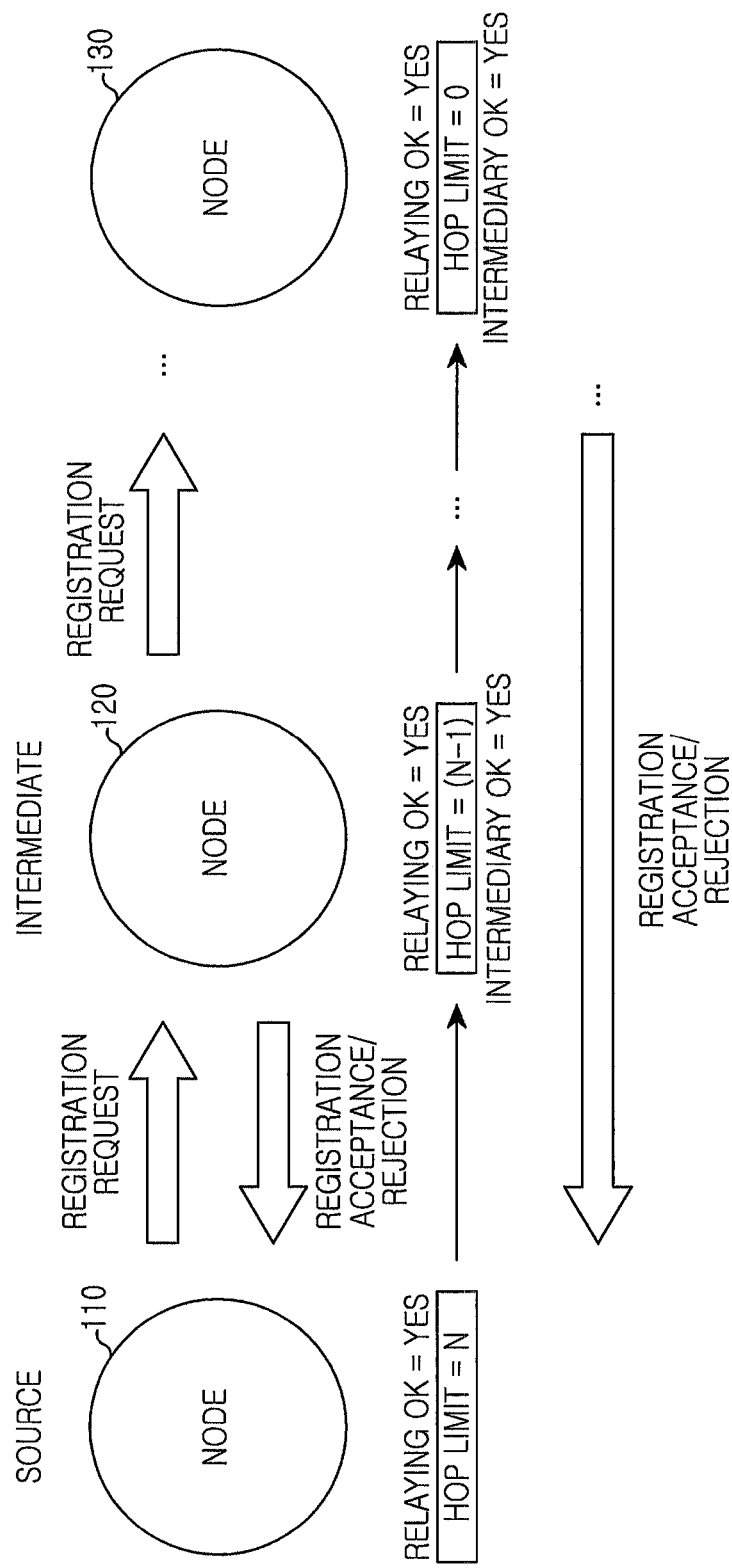

Also, referring to FIG. 3B, when the indicator included in the discovery information received indicates relay acceptance (Relaying OK=YES), the second node relays the discovery information such that a registration operation is also performed in other nodes neighboring the second node 120. When the indicator included in the discovery information received indicates relay acceptance (Relaying OK=YES) and the user of the second node 120 selects the relay of the discovery information (Intermediary OK=YES), the second node 120 broadcasts the discovery information to a third node neighboring the second node 120. Herein, the information broadcast includes information of the first node 110, the Relaying OK indicator, and a hop limit (Hop Limit=(N−1) smaller by 1 than the hop limit (Hop Limit=N) included in the discovery information received from the second node 120. That is, the second node 120 decreases the hop limit by 1 since one relay occurs when the discovery information received is relayed to the third node.

Figure 3C:
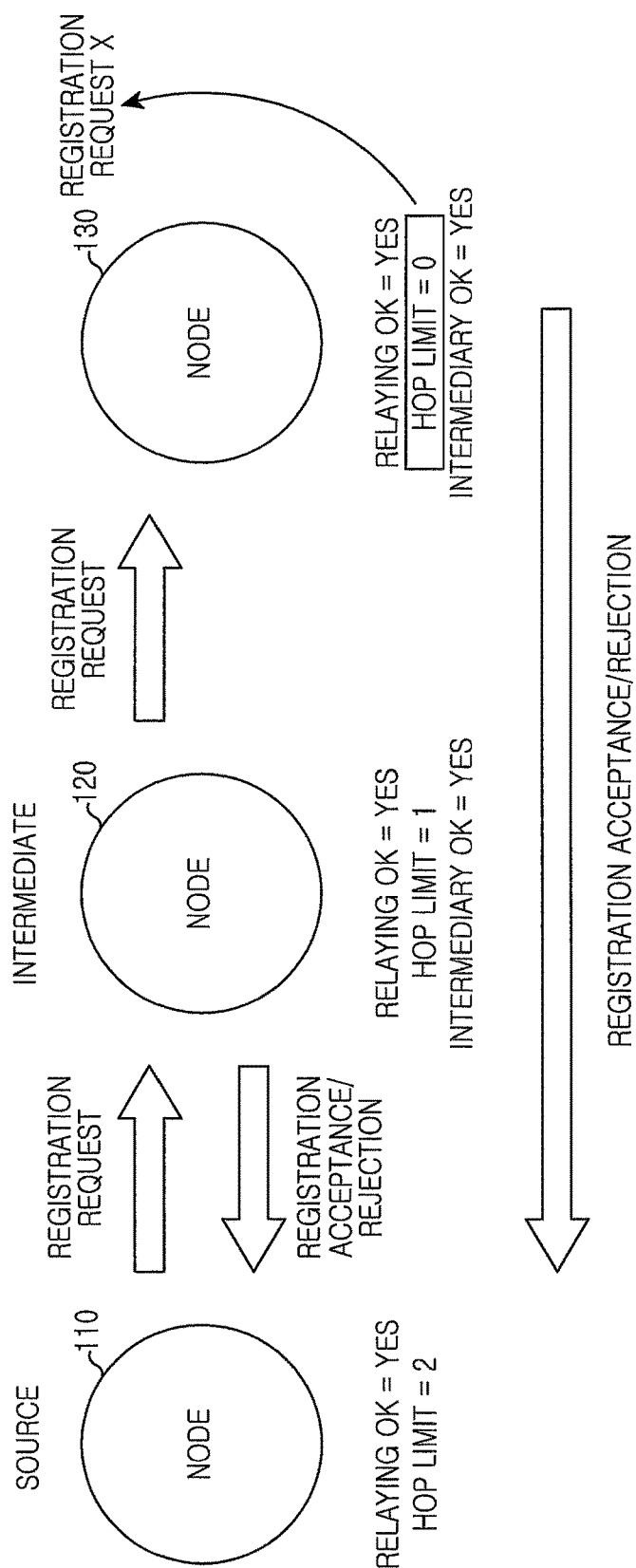

As illustrated in FIG. 3C, when the user selects the relay of the discovery information in the respective nodes (Intermediary OK=YES), this successive registration request operation in these neighbor nodes may be performed repeatedly until the hop limit becomes zero (Hop Limit=0). The hop limit is 2 in the first node 110, the hop limit is 1 in the second node 120 due to the occurrence of one relay, and the hop limit is 0 in the third node 130 due to the occurrence of two relays. Therefore, in the third node 130, since the hop limit is zero (0), no more relay operation is performed even when the user selects the relay of the discovery information (Intermediary OK=YES).

Figure 3D:
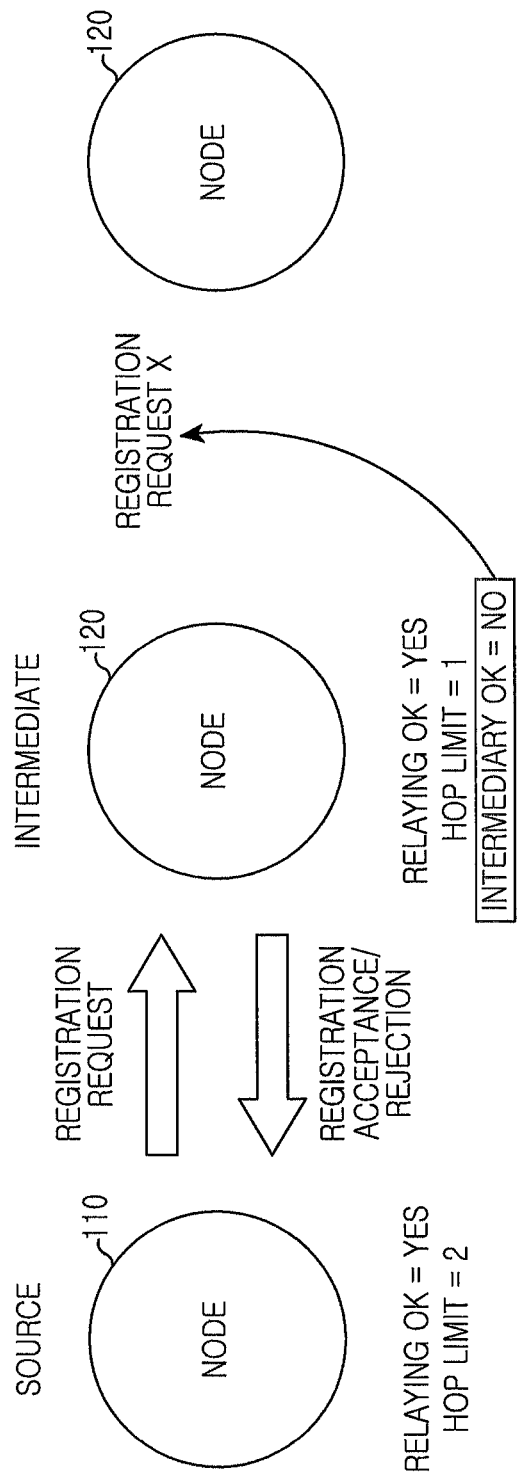

As illustrated in FIG. 3D, no more relay operation is performed when the user does not select the relay of the discovery information (Intermediary OK=NO).

Figure 4:
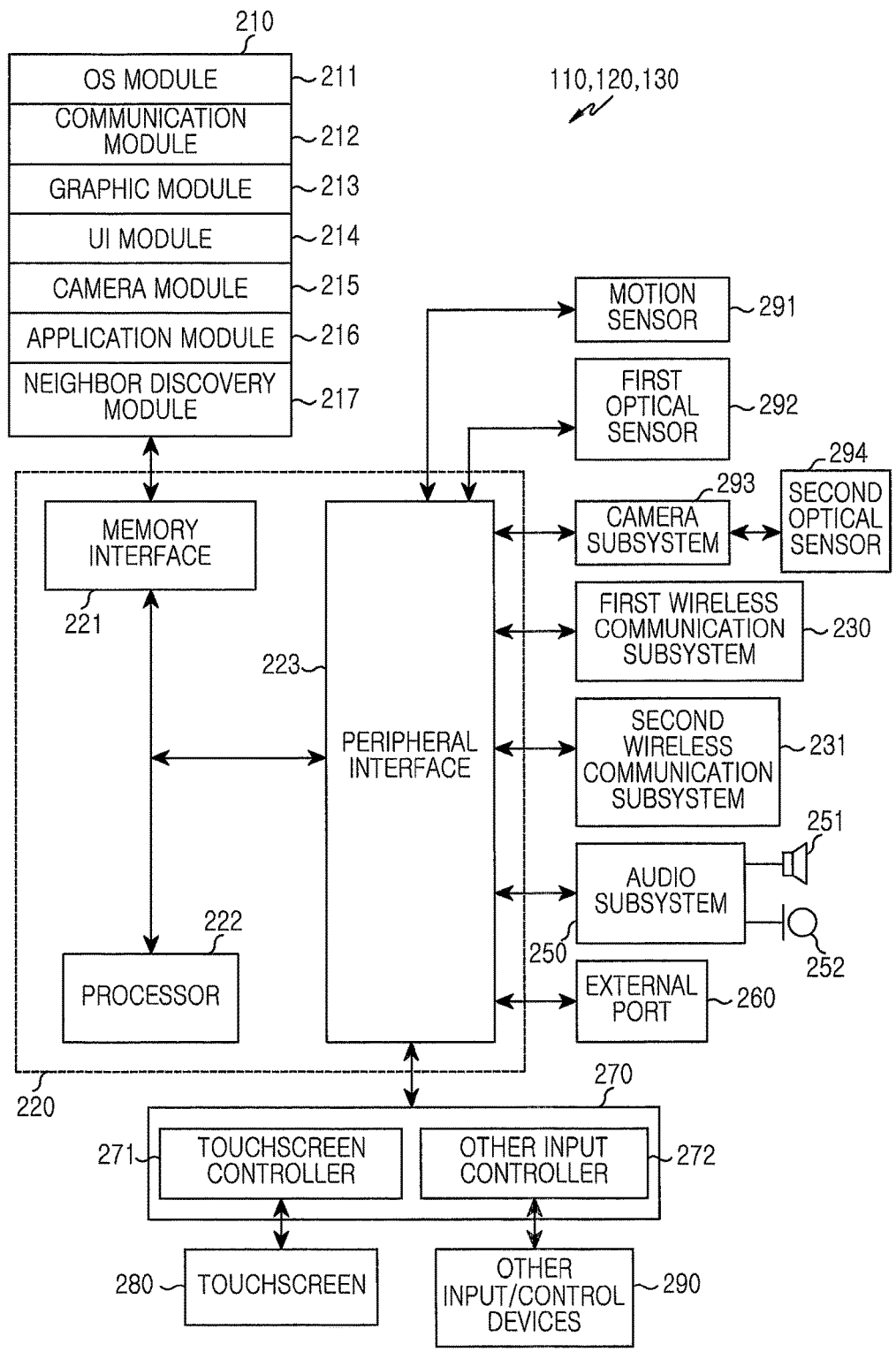
FIG. 4 illustrates a block diagram of a user terminal for a neighbor discovery operation according to embodiments of the present disclosure.

FIG. 4 illustrates a block diagram of a user terminal for a neighbor discovery operation according to embodiments of the present disclosure. The configuration of the user terminal may be the internal configuration of the nodes 110, 120 and 130 described above. The user terminal includes a memory unit 210, a processor unit 220, a first wireless communication subsystem 230, a second wireless communication subsystem 231, an external port 260, an audio subsystem 250, a speaker 251, a microphone 252, an input/output (I/O)

system 270, a touchscreen 280, and other input/control devices 290. The memory unit 210 and the external port 260 may be provided in plurality.

The processor unit 220 may include a memory interface 221, at least one processor 222, and a peripheral interface 223. In some cases, the processor unit 220 will also be referred to as a processor. The memory interface 221 may be separated from the processor 222 and/or the peripheral interface 223, or may be integrated into at least one integrated circuit.

The processor 222 executes various software programs to perform various functions for the user terminal, and performs processes and controls for voice communication and data communication. In addition to these general functions, the processor 222 executes a software module (instruction set) stored in the memory unit 210 and performs various functions corresponding to the software module. In particular, the processor 222 performs the neighbor discovery operations according to the embodiments of the present disclosure in cooperation with software modules stored in the memory unit 210.

For example, when the user terminal is the first node requesting a neighbor discovery operation, the processor 222 controls the modules of the memory unit 210 to broadcast the discovery information to one or more second nodes neighboring the first node and register one or more nodes responding to the discovery information among the second nodes.

As another example, when the user terminal is the second node receiving a neighbor discovery operation request, the processor 222 controls the modules of the memory unit 210 to receive the first discovery information broadcast from the first node and inquire of the user of the second node whether to register the first node and whether to relay the first discovery information, in response to the reception of the first discovery information. When the user of the second node selects the registration of the first node, the processor 222 registers the first node. When the indicator included in the first discovery information indicates relay acceptance, the processor 222 broadcasts the second discovery information to the third node neighboring the second node in response to the selection of the relay of the first discovery information by the user of the second node.

The processor 222 may include at least one data processor, image processor, or codec. The data processor, the image processor, or the codec may be configured separately. Also, the processor may be configured by a plurality of processors performing different functions.

The peripheral interface 223 connects various peripheral devices and the I/O system 270 to the processor 222 and the memory unit 210 (through the memory interface 221).

The various elements of the user terminal may be coupled by at least one communication bus (not illustrated) or stream line (not illustrated).

The external port 260 is used to connect the user terminal to other user terminals directly or indirectly through a network (for example, Internet, intranet, or wireless LAN). The external port 260 may be, for example, a universal serial bus (USB) port or a FireWire port, but is not limited thereto.

A motion sensor 291 and a first optical sensor 292 may be connected to the peripheral interface 223 to perform various functions. For example, the motion sensor 291 and the first optical sensor 292 may be connected to the peripheral interface 223 to sense a motion of the user terminal and detect light from the outside. In addition, other sensors such as a positioning system, a temperature sensor, and a biosensor may be connected to the peripheral interface 223 to perform relevant functions.

A camera subsystem 293 may be connected to a second optical sensor 294 to perform camera functions such as photographing and video clip recording.

The first optical sensor 292 and the second optical sensor 294 may include a charged coupled device (CCD) or a complementary metal-oxide semiconductor (CMOS) device.

A communication function is performed through one or more wireless communication subsystems 230 and 231. The wireless communication subsystems 230 and 231 may include a radio frequency (RF) receiver and transceiver and/or an optical (e.g., infrared) receiver and transceiver. The first wireless communication subsystem 230 and the second wireless communication subsystem 231 may be divided according to communication networks through which the user terminal communicate. For example, the communication network may include, but not limited to, communication subsystems operated through a GSM (Global System for Mobile Communication) network, an EDGE (Enhanced Data GSM Environment) network, a CDMA (Code Division Multiple Access) network, a W-CDMA (W-Code Division Multiple Access) network, an LTE (Long Term Evolution) network, an OFDMA (Orthogonal Frequency Division Multiple Access) network, a Wi-Fi (Wireless Fidelity) network, a WiMax network, and/or a Bluetooth network. According to embodiments of the present disclosure, when user terminals perform Wi-Fi communication through a Wi-Fi network, one of the first wireless communication subsystem 230 and the second wireless communication subsystem 231 may perform near field communication by Wi-Fi communication. The first wireless communication subsystem 230 and the second wireless communication subsystem 231 may be integrated into one wireless communication subsystem.

The audio subsystem 250 is connected to the speaker 251 and the microphone 252 to perform audio stream input/output functions such as voice recognition, voice replication, digital recording, and phone functions. That is, the audio subsystem 250 communicates with the user through the speaker 251 and the microphone 252. The audio subsystem 250 receives a data stream through the peripheral interface 223 of the processor unit 220 and converts the received data stream into an electric stream. The electric stream is transmitted to the speaker 251. The speaker 251 converts the electric stream into sound waves audible by humans and outputs the same. The microphone 252 converts sound waves received from humans or other sound sources into an electric stream. The audio subsystem 250 receives an electric stream converted from the microphone 252. The audio subsystem 250 converts the received electric stream into an audio data stream and transmits the audio data stream to the peripheral interface 223. The audio subsystem 250 may include an attachable/detachable earphone, a headphone, or a headset.

The I/O system 270 may include a touchscreen controller 271 and/or other input controller 272. The touchscreen controller 271 may be connected to the touchscreen 280. For example, the touchscreen 280 and the touchscreen controller 271 may detect a touch, a motion, or a stop thereof by using multi-touch detection technologies including a proximity sensor array or other elements, as well as capacitive, resistive, infrared and surface acoustic wave technologies for determining one or more touch points with the touchscreen 280. The other input controller 272 may be connected to the other input/control devices 290. The other input/control devices 290 may include one or more volume up/down buttons. The buttons may be push buttons, rocker buttons, or the like. The other input/control devices 272 may include a rocker switch, a thumb wheel, a dial, a stick, and/or a pointer device such as a stylus.

The touchscreen 280 provides an input/output interface between the user terminal and the user. Specifically, the touchscreen 280 is a medium that transmits a user touch input to the user terminal and displays an output from the user terminal to the user. The touchscreen 280 displays an output from the user terminal as a visual output to the user. The visual output may be represented by a text, a graphic, a video, or a combination thereof. The touchscreen 280 may use various displays. For example, the touchscreen 280 may use an LCD (liquid crystal display), an LED (Light Emitting Diode), an LPD (light emitting polymer display), an OLED (Organic Light Emitting Diode), an AMOLED (Active Matrix Organic Light Emitting Diode), or an FLED (Flexible LED).

According to embodiments of the present disclosure, the touchscreen 280 provides various information for a neighbor discovery operation in a display form that can be visually recognized by the user. For example, a user of a node transmitting a registration request may select nodes desiring registration from the information provided to the touchscreen 280, and input a message to be transmitted to nodes receiving a registration request. Also, the user of the node transmitting a registration request may set a value of the indicator such that other nodes can relay the discovery information. The user of the node receiving a registration request may confirm a registration request message from the information provided to the touchscreen 280, and select whether to register the node transmitting a registration request. Also, the user of the node receiving a registration request may select the relay of the discovery information.

The memory 210 may be connected to the memory interface 221. The memory unit 210 may include one or more high-speed random-access memories (RAMs) such as magnetic disk storage devices, one or more nonvolatile memories, one or more optical storage devices, and/or one or more flash memories (e.g., NAND flash memories or NOR flash memories). The memory unit 210 stores software. Elements of the software include an operation system (OS) module 211, a communication module 212, a graphic module 213, a user interface (UI) module 214, a camera module 215, an application module 216, and a neighbor discovery module 217. Since the module that is an element of the software may be represented as a set of instructions, the module may be referred to as an instruction set. The module may also be referred to as a program. The modules included in the memory unit 210 include instructions for performing a neighbor discovery operation according to the embodiments of the present disclosure.

The OS module 211 includes various software elements for controlling a general system operation. For example, control of the general system operation includes memory control/management, storage hardware (device) control/management, and power control/management. The OS module 211 also performs a function for enabling smooth communication between various hardware elements (devices) and software elements (modules).

The communication module 212 may enable communication with other user terminals (such as computers, servers, and/or portable terminals) through the wireless communication subsystems 230 and 231 or the external port 260. According to embodiments of the present disclosure, the communication module 212 supports operations of various layers for communication with other user terminals. For example, the communication module 212 supports protocols such as RPC, XNS, and LDAP in a session layer, supports a Transmission Control Protocol (TCP) in a transport layer, supports an Internet Protocol (IP) in a network layer, and supports a Medium Access Control (MAC) operation in a data link layer.

The graphic module 213 includes various software elements for providing and displaying graphics on the touchscreen 280. The graphics include texts, web pages, icons, digital images, videos, and animations.

The UI module 214 includes various software elements related to a user interface. Specifically, the UI module includes information about how the state of a user interface changes and/or information about under what condition the state of a user interface changes. According to embodiments of the present disclosure, the UI module 214 includes contents related to a state change of information displayed on the touchscreen 280 in a neighbor discovery operation.

The camera module 215 includes camera-related software elements that enable camera-related processes and functions. The application module 216 includes a browser application, an e-mail application, an instant message application, a word processing application, a keyboard emulation application, an address book application, a touch list application, a widget application, a digital right management (DRM) application, a voice recognition application, a voice replication application, a position determining function application, a location-based service (LBS) application, and the like. The neighbor discovery module 217 includes a neighbor list indicating the registration/non-registration of neighbor nodes, and includes a software element according to an overall flow of the neighbor discovery operation according to the embodiments of the present disclosure.

According to embodiments of the present disclosure, the application module 216 includes a software element for processing the discovery information in an application layer. For example, the application module 216 includes an operation of providing a neighbor list, relay acceptance/rejection indicator setup inquiry information, relay acceptance/rejection inquiry information, registration/non-registration inquiry information, and a received registration request message on the touchscreen 280. Also, the application module 216 receives user inputs through the touchscreen 280, such as a registration request message, a relay acceptance/rejection indicator value, and a relay acceptance/rejection inquiry result, and generates relevant discovery information.

The memory unit 210 may further include an additional module (instructions) in addition to the above-described modules. Also, in some cases, the memory unit 210 may not use some of the modules (instructions). In addition, various functions of the user terminal according to the present disclosure, which have been described above and will be described below, may be implemented by any combination of hardware and/or software including one or more stream processings and/or an application-specific integrated circuit (ASIC).

Figure 5:
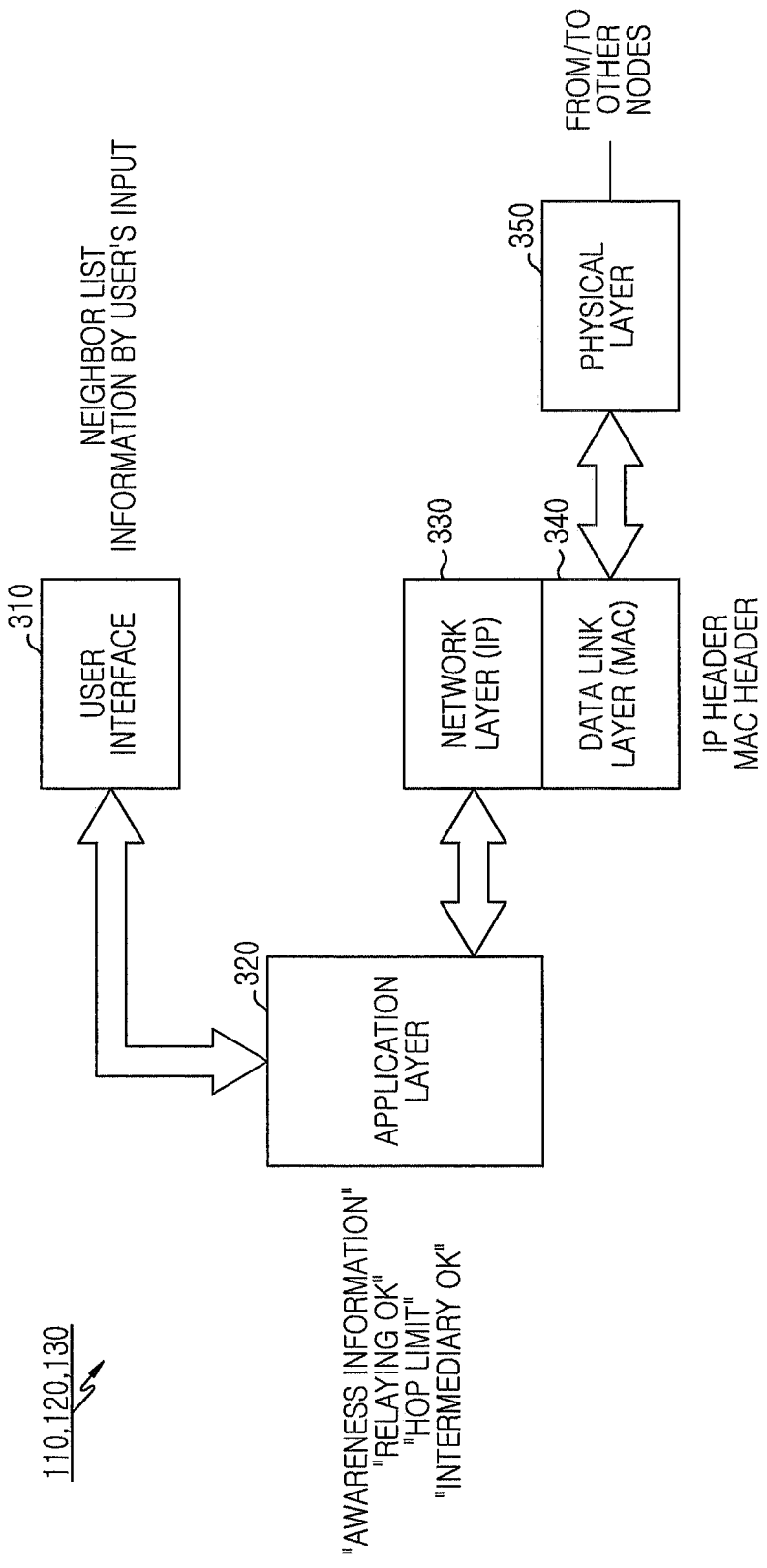
FIG. 5 illustrates a layer structure of a user terminal for an operation according to embodiments of the present disclosure.

FIG. 5 illustrates a layer structure of a user terminal for an operation according to embodiments of the present disclosure. A physical layer 350 described below corresponds to the wireless communication subsystems 230 and 231 illustrated in FIG. 4. Also, a network layer 330 and a data link layer 340 correspond to the communication module 212, an application layer 320 corresponds to the application module 216, and a user interface 310 corresponds to the touchscreen 280.

When the user terminal is a source node requesting neighbor node registration, the user interface 310 corresponds to the touchscreen 280 illustrated in FIG. 4, and provides a neighbor list and user input information in a display form that can be visually recognized by the user. The user input information includes relay acceptance/rejection indicator setup inquiry information. Also, the user interface 310 provides a window for creating a registration request message.

The application layer 320 receives information input through the user interface 310, and generates relevant application layer information. The application layer information includes a registration request message (e.g., Awareness Information, such as, for example, a hello message), information according to a relay acceptance/rejection indicator setup inquiry result (Relaying OK), and a hop limit. The hop limit may be set through a user input or may be predetermined by a service provider or an operator.

The network layer 330 supports an Internet protocol (IP), and adds an IP header to the application layer information generated by the application layer 320. The data link layer 340 generates a MAC layer packet by adding the MAC header to the information generated by the network layer 330. The physical layer 350 physical-layer processes the MAC layer packet generated by the data link layer 340, and broadcasts the result as neighbor discovery information to other nodes.

When the user terminal is an intermediate node or a target node receiving a neighbor node registration request, the physical layer 350 receives the broadcast discovery information. The data link layer 340 and the network layer 330 divide the MAC header and the IP header from the received discovery information. The application layer 320 receives the discovery information processed by the network layer 330, and provides a registration request message to the user interface 310. The user interface 310 displays the registration request message and the registration/non-registration inquiry information. Also, the user interface 310 may display the neighbor list. When the user terminal is an intermediate node receiving a neighbor node registration request, the user interface 310 may further display information for inquiring whether to accept the relay of the received discovery information. The information for inquiring the acceptance/rejection of the relay of discovery information is displayed only when the source node requesting neighbor node registration sets the information according to the relay acceptance/rejection indicator setup inquiry result (Relaying OK) to "YES". Through the registration request message displayed on the user interface 310, the user may detect from which node the registration has been requested, and may request registration. Also, the user may set relay acceptance/rejection through the relay acceptance/rejection inquiry information displayed on the user interface 310.

When the user terminal is an intermediate node receiving a neighbor node registration request, the application layer 320 receives information input through the user interface 310, and generates relevant application layer information. The generated application layer information is divided into response information about a registration request to be transmitted to the source node, and relay information to be broadcast to other nodes. As the response information about the registration request, the application layer information includes a message responding to the registration request (Awareness Information). As the relay information to be broadcast to other nodes, the application layer information includes a registration request message (Awareness Information), a relay acceptance/rejection indicator (Relaying OK), a hop limit, and information according to the relay acceptance/rejection inquiry result (Intermediary OK). The registration request message (Awareness Information) and the relay acceptance/rejection indicator (Relaying OK) are set without changing the information received from the source node. The hop limit may be set through a user input or may be predetermined by a service provider or an operator.

When the user terminal is a target node receiving a neighbor node registration request, the application layer 320 receives information input through the user interface 310, and generates relevant application layer information. The application layer information includes a message responding to the registration request (Awareness Information).

The application layer information generated by the application layer 320 is transmitted as a registration acceptance/rejection response message with respect to the registration request, to the source node through the network layer 330, the data link layer 340 and the physical layer 350. Also, the application layer information generated by the application layer 320 is broadcast as discovery information to other nodes through the network layer 330, the data link layer 340 and the physical layer 350.

Figure 6:
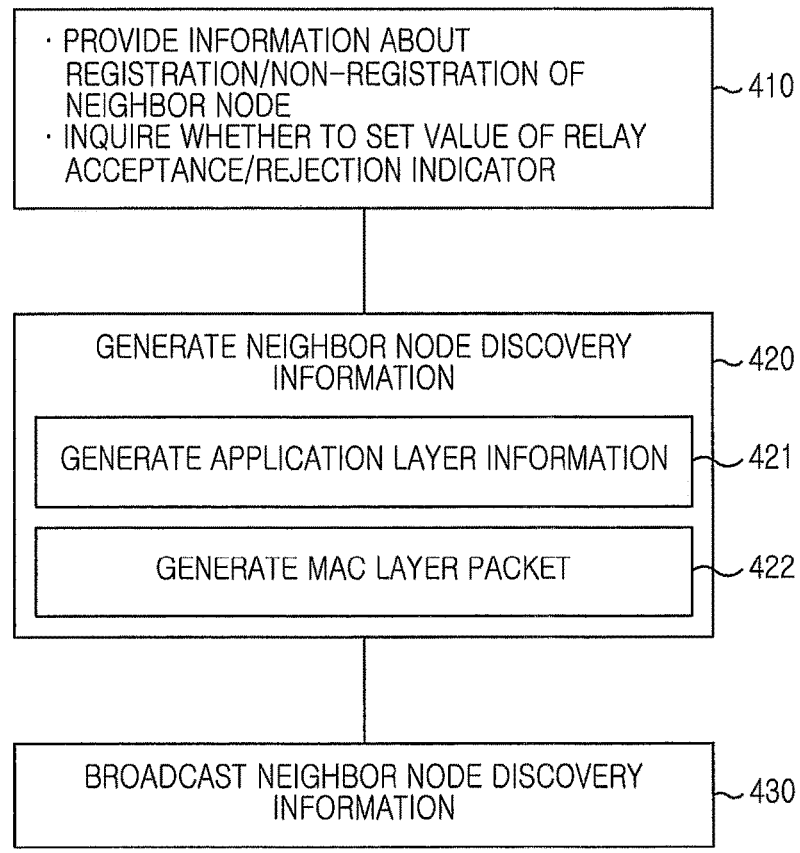
FIG. 6 illustrates a process flow of a user terminal as a source node for a neighbor discovery operation according to embodiments of the present disclosure.

FIG. 6 illustrates a process flow of a user terminal as a source node for a neighbor discovery operation according to embodiments of the present disclosure. An operation according to this process flow is performed by the processor 222 and the memory unit 210 illustrated in FIG. 4, and the memory unit 210 includes at least one module that can be executed by the processor 222. The module includes the communication module 212, the UI module 214, the application module 216, and the neighbor discovery module 217. These modules include an instruction for the following operation.

Figure 10:
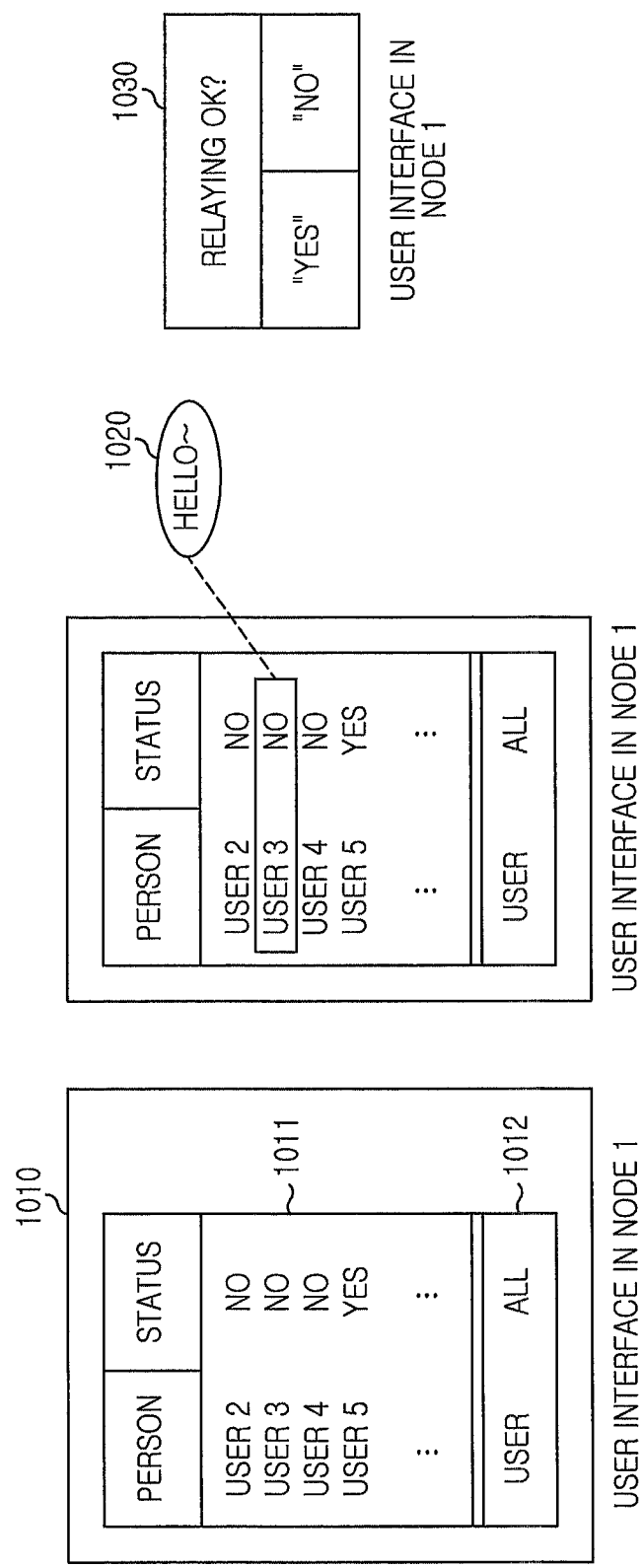
FIG. 10 illustrates an example of a user screen displayed on a source node in a neighbor discovery operation according to embodiments of the present disclosure.

In step 410, the user interface 310 of FIG. 5 provides a neighbor list including information about the registration/non-registration of a neighbor node, and performs an operation of inquiring whether to set a value of the relay acceptance/rejection indicator. This operation is performed in a display form that can be visually recognized by the user. An example of the display is illustrated in FIG. 10. A neighbor list 1010 and information 1030 for inquiring whether to set a value of the relay acceptance/rejection indicator are displayed on the user interface 310. When the user selects "YES" from the information 1030, this selection indicates the acceptance of the relay of neighbor discovery information from the information 1030, and when the user selects "NO", this selection indicates the rejection of the relay of neighbor discovery information.

The neighbor list 1010 includes neighbor nodes (users) and a field 1011 storing a state information about registration/non-registration. The user may select a node, which is to be registered, from the display of the neighbor list 1010. As another scheme, the user may confirm the state of the neighbor list 1010 and request registration of all neighbor nodes. When the user selects a user 3, a window 1020 for creating a registration request message is displayed, and the user may input a registration request message through the window 1020. In order to request the registration of all nodes, the user may select "USER ALL" 1012 that is provided at a lower end of the neighbor list 1010. Likewise, in this case, a window 1020 for creating a registration request message is displayed, and the user may input a registration request message through the window 1020. As another method, even when no neighbor node is registered in the neighbor list, "USER ALL" may be selected to request registration of any neighbor node (as illustrated, for example in FIGS. 20A and 20B).

Figure 8A:
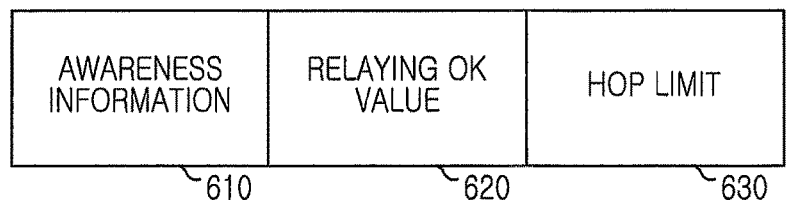
FIGS. 8A and 8B illustrate the structures of a MAC layer packet and application layer information generated by a user terminal as a source node/intermediate node in a neighbor discovery operation according to embodiments of the present disclosure.
Figure 8B:
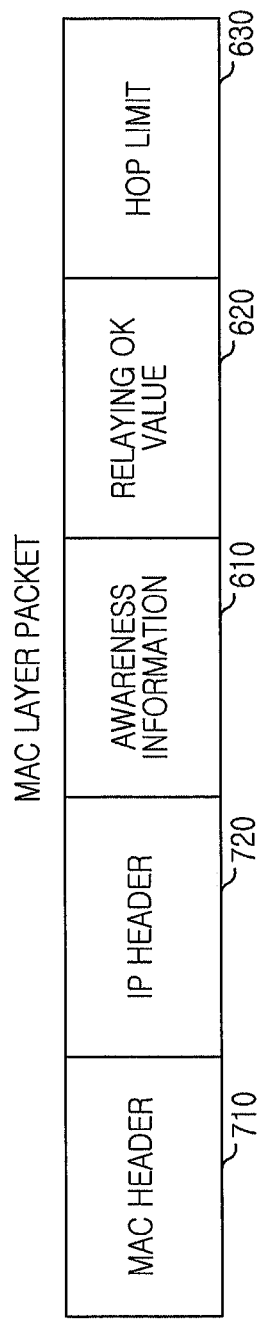

In step 420, the application layer 320, the network layer 330, the data link layer 340, and the physical layer 350 generate neighbor discovery information. Step 420 includes step 421 and step 422. In step 421, the application layer 320 generates application layer information. As illustrated in FIG. 8A, the application layer information includes awareness information 610 as a registration request message, a relay acceptance/rejection indicator value 620, and a hop limit 630. In step 422, the network layer 330 and the data link layer 340 generate a MAC layer packet by adding an IP header and a MAC header to the generated application layer information. As illustrated in FIG. 8B, the MAC layer packet includes a MAC header 710, an IP header 720, awareness information 610 as a registration request message, a relay acceptance/rejection indicator value 620, and a hop limit 630. The hop limit may be predetermined by a service provider or an operator or may be set through a user input. The header information 710 and 720 includes source node information and neighbor node information. When the user selects only one node and requests registration, the neighbor node information includes only information about a target node selected by the user. When the user requests registration of all neighbor nodes, the neighbor node information includes information indicating, all of the neighbor nodes.

In step 430, the physical layer 350 receives the MAC layer packet, physical-layer processes the received MAC layer packet, and broadcasts the result as neighbor discovery information to other neighbor nodes. The other neighbor nodes are one or more nodes having a hop limit that is different by 1 from that of the source node. Through this broadcast, the source node requests the registration of concerned friends and fellows and neighbor nodes that are concerned objects.

Figure 7:
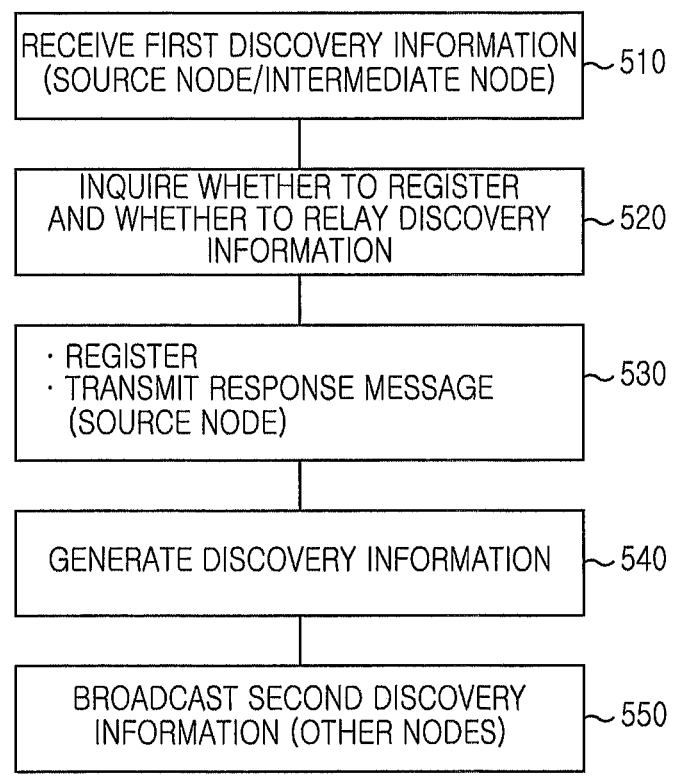
FIG. 7 illustrates a process flow of a user terminal as an intermediate node for a neighbor discovery operation according to embodiments of the present disclosure.

FIG. 7 is a diagram illustrating a process flow of a user terminal as an intermediate node for a neighbor discovery operation according to embodiments of the present disclosure. An operation according to this process flow is performed by the processor 222 and the memory unit 210 illustrated in FIG. 4, and the memory unit 210 includes at least one module that can be executed by the processor 222. The module includes the communication module, the UI module 214, the application module 216, and the neighbor discovery module 217. These modules include an instruction for the following operation.

In step 510, the physical layer 350, the data link layer 340, the network layer 330 and the application layer 320 illustrated in FIG. 5 receive first discovery information broadcast from a first node. The first node may be a source node or an intermediate node. The first discovery information includes information of the first node, an indicator (Relaying OK) indicating whether to accept the relay of discovery information received to other nodes, and a hop limit indicating the number of available relays of discovery information. A value of the indicator is set through a user input. The hop limit may be predetermined by a service provider or an operator or may be set through a user input. The first discovery information further includes information of one or more neighbor nodes selected by the user of the first node. When the registration target node is specified as a second node, the neighbor node information includes information of the second node. When the registration target node is not specified as the second node, the neighbor node information includes information indicating all neighbor nodes.

In step 520, in response to the reception of the first discovery information, the user interface 310 performs an operation of inquiring of the user of the second node whether to register the first node and whether to relay the first discovery information. This operation is performed in a display form that can be visually recognized by the user. An example of the display is illustrated in FIGS. 11A and 11B.

Figure 11A:
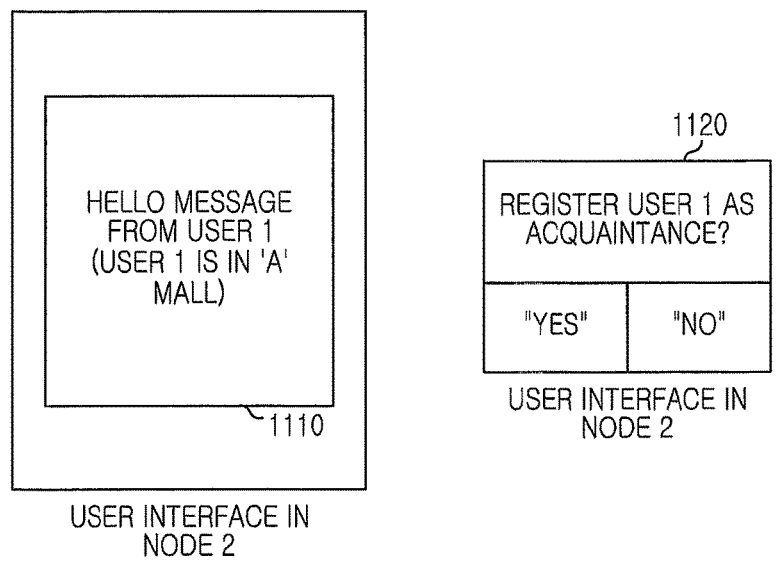
FIG. 11A illustrates an example of a user screen displayed on a target node in a neighbor discovery operation according to an embodiment of the present disclosure.

FIG. 11A illustrates an example of a display form in the case where the second node is specified as a target node. The user interface 310 inquires of the user of the second node whether to register the first node, by displaying a received registration request message 1110. The registration request message 1110 includes a registration request message input by the user of the first node, and position information about the user of the first node. Also, in response to the registration request message, the user interface 310 inquires of the user of the second node whether to register the first node, by displaying information 1120 for inquiring whether to register the first node.

Figure 11B:
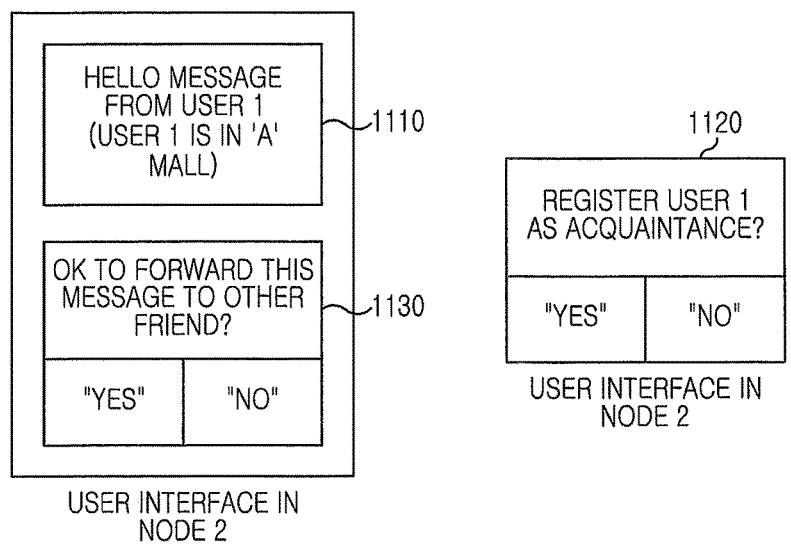
FIG. 11B illustrates an example of a user screen displayed on an intermediate node in a neighbor discovery operation according to another embodiment of the present disclosure.

FIG. 11B illustrates an example of a display form in the case where the second node is specified as not a target node but all neighbor nodes. The user interface 310 inquires of the user of the second node whether to register the first node, by displaying a received registration request message 1110. The registration request message 1110 includes a registration request message input by the user of the first node, and position information about the user of the first node. Also, in response to the registration request message, the user interface 310 inquires of the user of the second node whether to register the first node, by displaying information 1120 for inquiring whether to register the first node. Also, the user interface 310 inquires of the user of the second node whether to relay the first discovery information, by displaying information 1130 for inquiring whether to relay the first discovery information. The information 1130 for inquiring whether to relay the first discovery information is displayed on the user interface 310 only when the indicator (Relaying OK) indicating whether to accept the relay of the received discovery information from the first node to other nodes is set to "YES".

In step 530, when the user of the second node selects the registration of the first node, that is, when the user of the second node selects "YES" from information 1020 illustrated in FIG. 11A or 11B, the application layer 320 registers the first node and transmits a response message indicating registration acceptance to the source node. On the other hand, when the user of the second node selects "NO" from the information 1020, that is, when the user of the second node selects "NO" from the information 1020 illustrated in FIG. 11A or 11B, the application layer 320 transmits a response message indicating registration rejection to the source node.

In step 540, when the indicator included in the first discovery information indicates relay acceptance (Relaying OK value), the application layer 320 generates second discovery information to be broadcast to a third node neighboring the second node, in response to the selection of the relay of the first discovery information by the user of the second node (selection of "YES" from the information 1130 of FIG. 11B). The second discovery information includes information of the source node, an indicator (Relaying OK value) included in the first discovery information of the source node, and a hop limit that is smaller by 1 than the hop limit included in the first discovery information.

In step 550, the network layer 330, the data link layer 340, and the physical layer 350 broadcast the generated second discovery information to the third node. The third node is one or more nodes having a hop limit that is different by 1 from that of the second node. That is, the hop limit is decreased through the broadcast of the discovery information. An operation of broadcasting the discovery information to a neighbor node is performed when the hop limit is greater than zero (0), and is interrupted when the hop limit is zero (0).

Figure 9A:
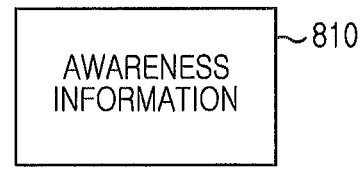
FIGS. 9A and 9B illustrate the structures of a MAC layer packet and application layer information generated by a user terminal responding to a registration request in a neighbor discovery operation according to embodiments of the present disclosure.
Figure 9B:
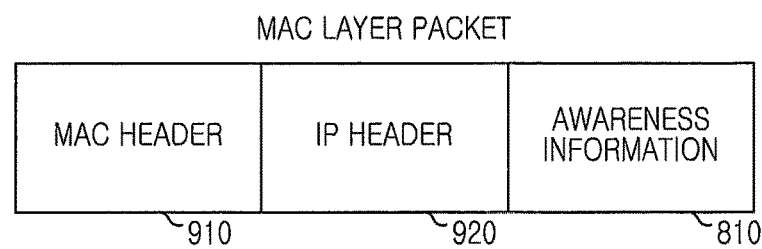

FIGS. 9A and 9B illustrate structures of a MAC layer packet and application layer information generated by a user terminal responding to a registration request in a neighbor discovery operation according to embodiments of the present disclosure. The application layer 320 of the user terminal responding to a registration request as illustrated in FIG. 5 generates application layer information as awareness information 810 as illustrated in FIG. 9A. The application layer information 810 may include "Acquaintance ACK" indicating registration acceptance or "Acquaintance NACK" indicating registration rejection. The network layer 330 and the data link layer 340 generate a MAC layer packet by adding an IP header 910 and a MAC header 920 to the application layer information 810. The headers 910 and 920 include information of a source node and information of a node responding to a registration request. The generated MAC layer packet is transmitted as a registration request response message to the source node through the physical layer 350.

Figure 12:
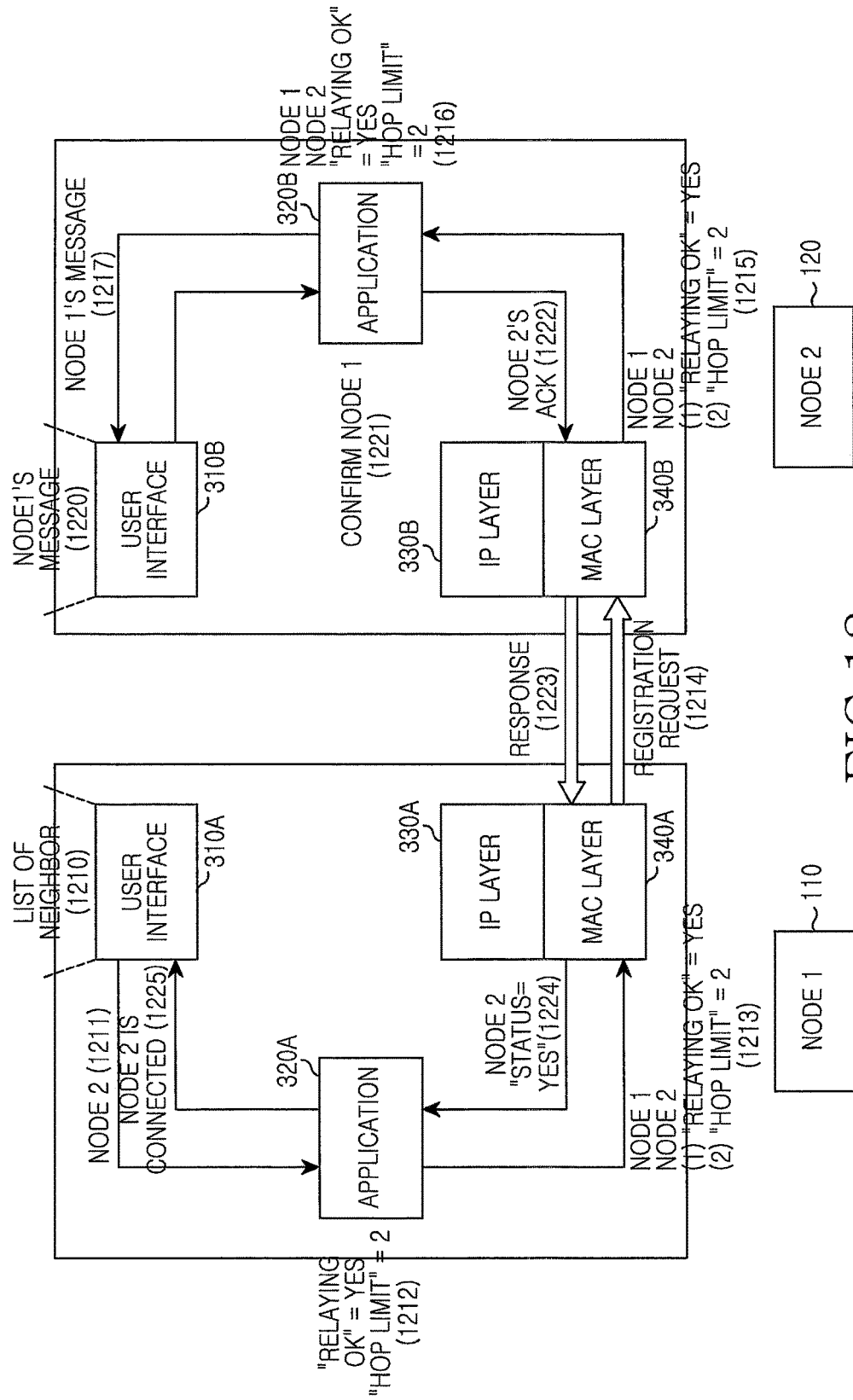
FIG. 12 illustrates detailed process flows in respective nodes in a neighbor discovery operation according to an embodiment of the present disclosure.

FIG. 12 illustrates detailed process flows in respective nodes in a neighbor discovery operation according to an embodiment of the present disclosure. FIG. 13 is a diagram illustrating user screens displayed in operations according to the process flows illustrated in FIG. 12. This process flow corresponds to the case where the first node 110 requests registration of the second node 120 and the second node 120 responds to the registration request of the first node 110. For the convenience of description, a description is made mainly of an operation of the first node 110 generating neighbor discovery information including a relay acceptance/rejection indicator and a hop limit and transmitting the neighbor discovery information to the second node 120, and an operation of the second node 120 responding to the neighbor discovery information. That is, an operation of the user inputting a registration request message and an operation of adding information of nodes will not be described. However, it should be noted that the operations which will not be described are performed for a neighbor discovery operation according to an embodiment of the present disclosure as described above.

A neighbor list is displayed on a user interface 310A of the first node 110 (step 1210). The user of the first node 110 may select Node 2 from the displayed neighbor list (step 1211, 1310 of FIG. 13A). In response to a user input, an application layer 320A generates application layer information (step 1212). For example, the application layer information may include a relay acceptance/rejection indicator value (Relaying OK=YES) and a hop limit (Hop limit=2). The application layer 320A transmits the generated application layer information to an IP layer 330A and a MAC layer 340A (step 1213). The application layer information is processed in the IP layer 330A, the MAC layer 340A and a physical layer (not illustrated), and is transmitted as neighbor discovery information from the first node 110 to the second node 120 to make a registration request (step 1214).

The neighbor discovery information is received by a MAC layer 340B and an IP layer 330B through a physical layer (not illustrated) of the second node 120 (step 1215). Thereafter, the neighbor discovery information is received by an application layer 320B (step 1216). The application layer 320B transmits a registration request message included in the received discovery information to the user interface (step 1217). A user interface 310B displays the registration request message received from the first node 110 (step 1220, FIG. 13B). Also, the user interface 310B displays information for inquiring whether to register the first node 110.

When the user of the second node 120 selects the registration of the first node 110, the application layer 320B confirms the first node 110 having requested registration (step 1221), and generates application layer information indicating registration acceptance. The application layer information is processed in the IP layer 330B, the MAC layer 340B and a physical layer (not illustrated), and is transmitted as a response message with respect to the registration request to the first node 110 (step 1223).

The registration request response message is received by the MAC layer 340A and the IP layer 330A through a physical layer (not illustrated) of the first node 110. The MAC layer 340A and the IP layer 330A perform a registration process with the second node 120 according to the registration request response message, change the state of the second node 120 to "YES", and transmit the fact to the application layer 320A. The application layer 320A receives state information of the second node 120, and displays a neighbor list, which indicates the connection (registration) of the second node 120, on the user interface 310A (step 1225, 1320 of FIG. 13C). A neighbor list indicating the registration of the first node 110 is displayed on the user interface 310E of the second node 120 (1330 of FIG. 13D).

Figure 14A:
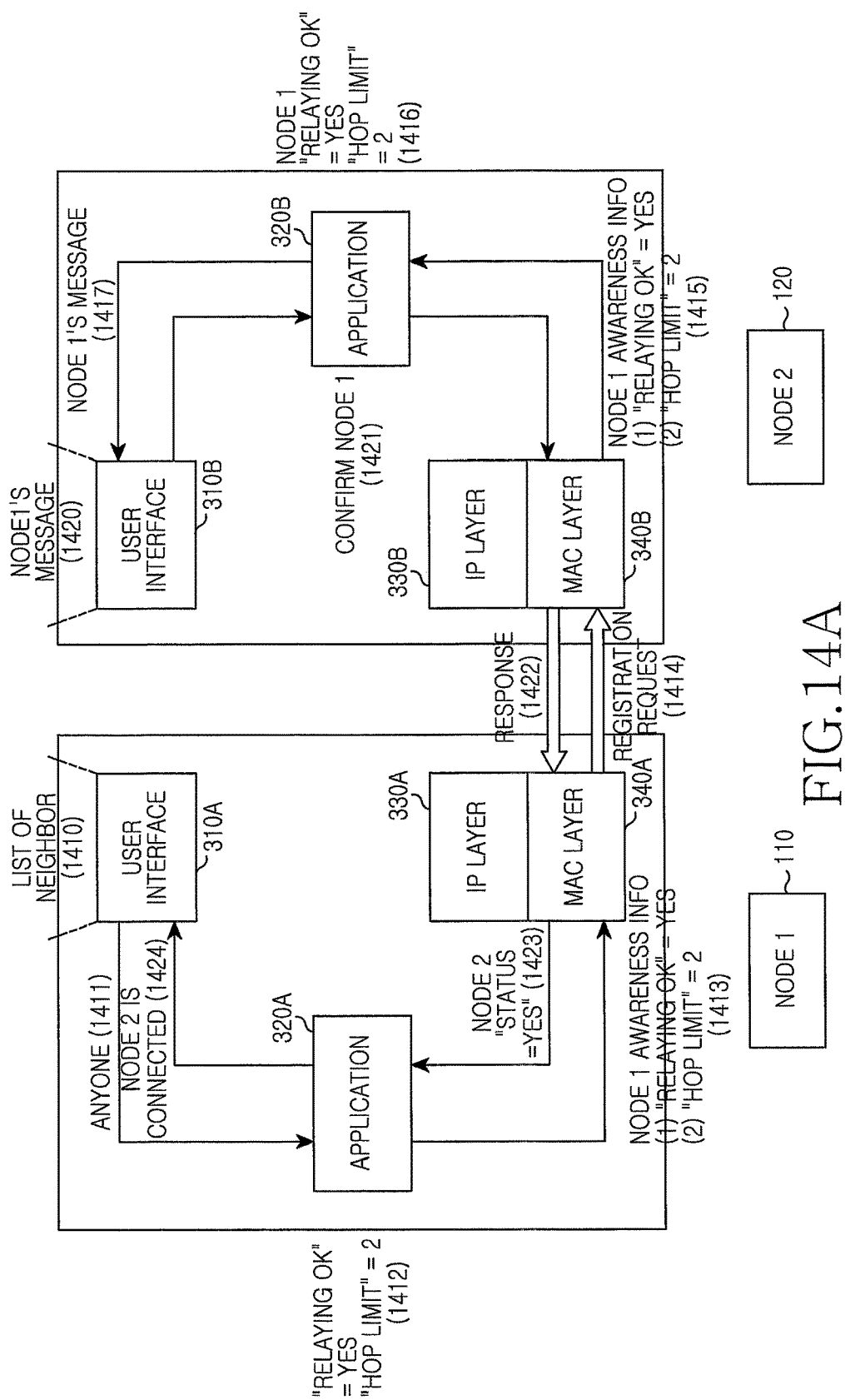
FIGS. 14A and 14B illustrate detailed process flows in respective nodes in a neighbor discovery operation according to another embodiment of the present disclosure.
Figure 14B:
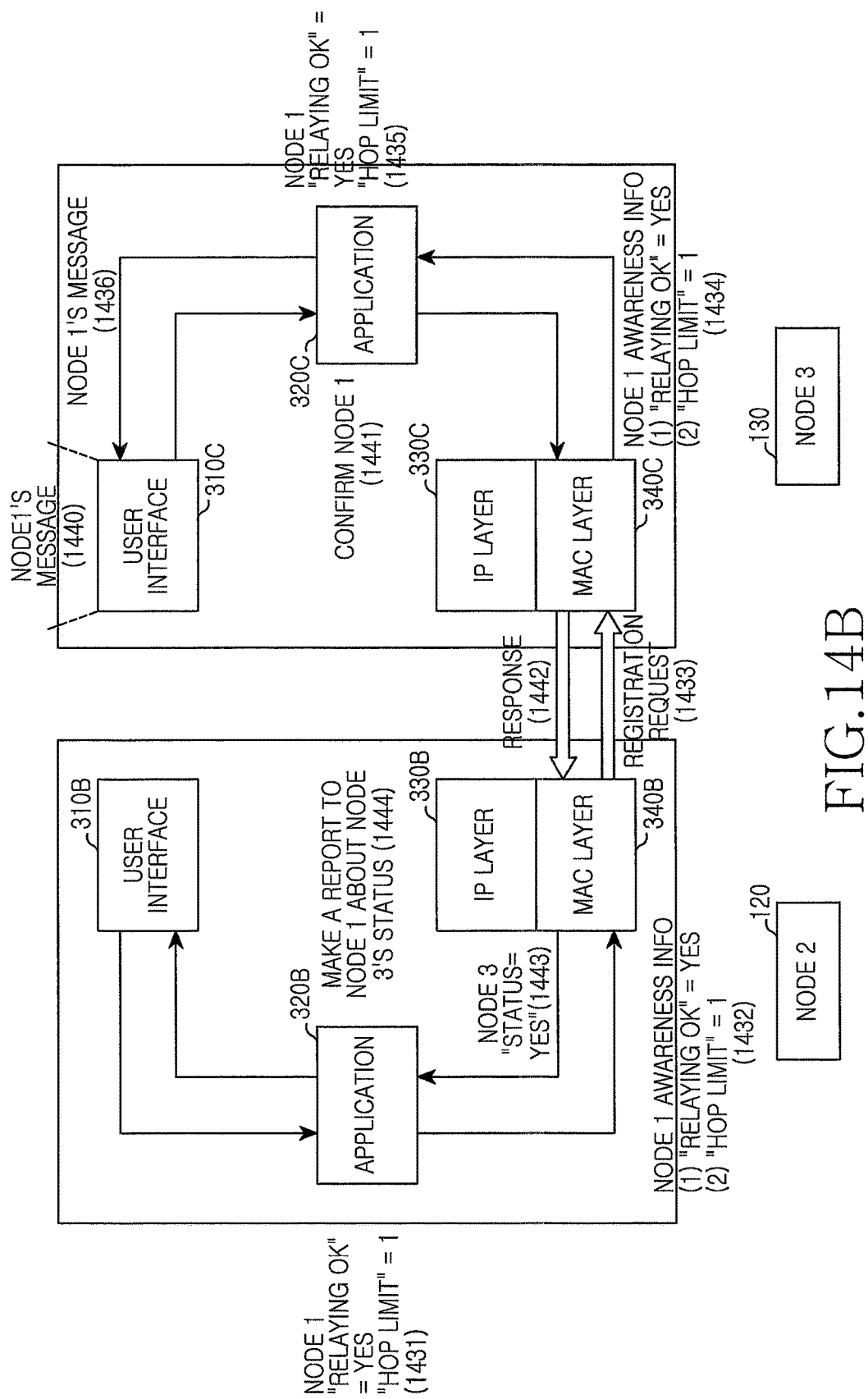
Figure 15A:
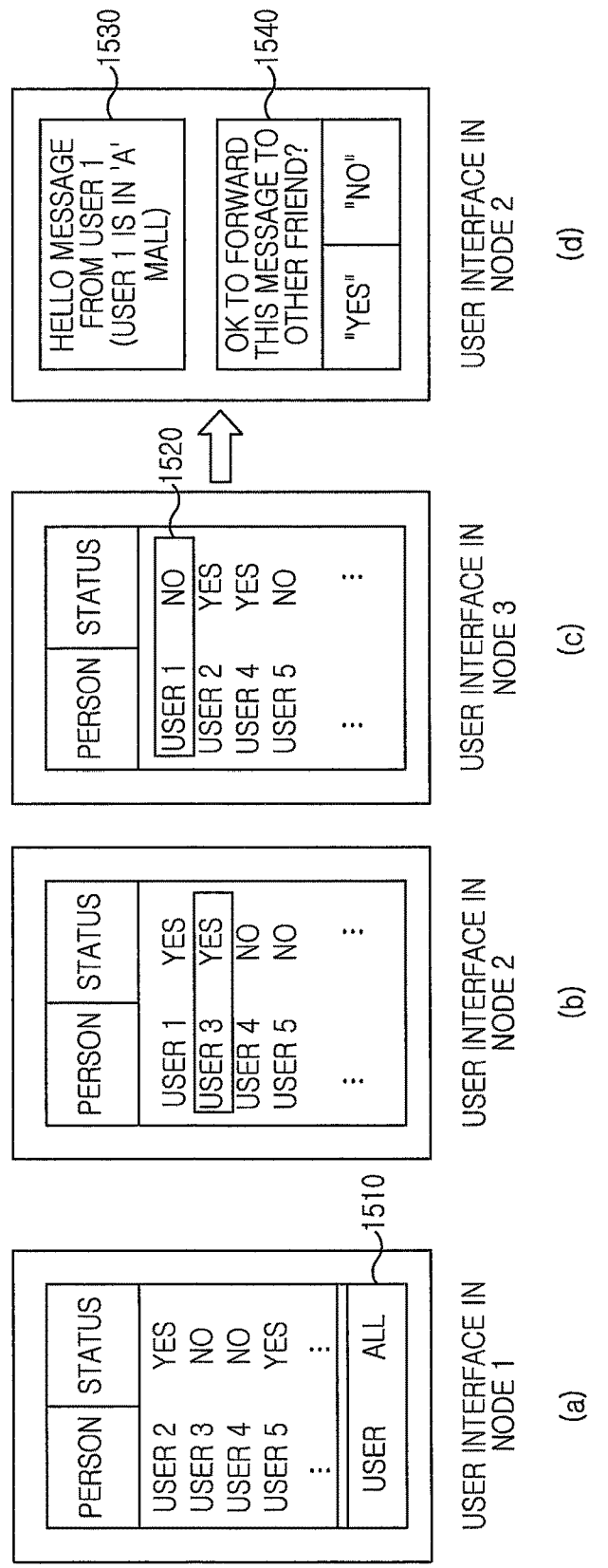
FIGS. 15A and 15B illustrate user screens displayed in operations according to the process flows illustrated in FIGS. 14A and 14B.
Figure 15B:
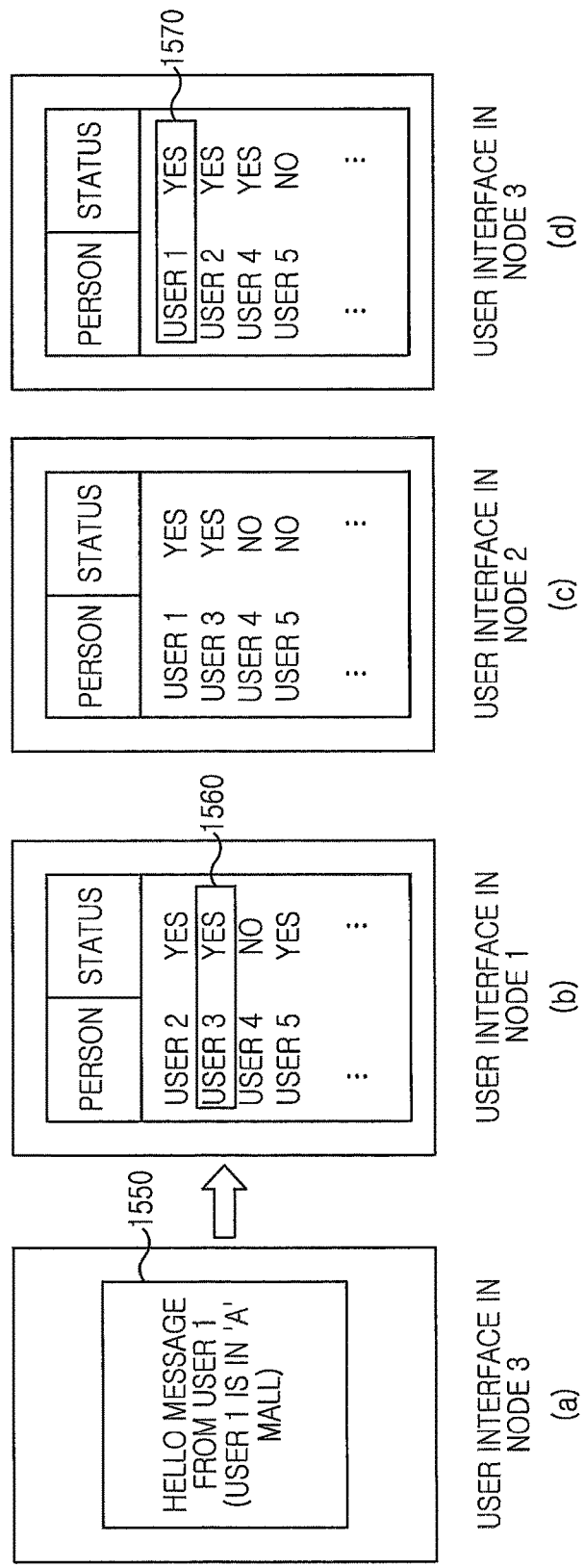

FIGS. 14A and 14B illustrate detailed process flows in the respective nodes in a neighbor discovery operation according to another embodiment of the present disclosure. FIGS. 15A and 15B illustrate user screens displayed in operations according to the process flows illustrated in FIGS. 14A and 14B. For the convenience of description, a description is made mainly of an operation of the nodes 110 and 120 generating neighbor discovery information including a relay acceptance/rejection indicator and a hop limit and transmitting the neighbor discovery information to the nodes 120 and 130, and an operation of the nodes 120 and 130 responding to the neighbor discovery information. That is, an operation of the user inputting a registration request message and an operation of adding information about whether to relay discovery and information of nodes will not be described. However, it should be noted that the operations which will not be described are performed for a neighbor discovery operation according to another embodiment of the present disclosure as described above.

The process flow illustrated in FIG. 14A illustrates an example of the case where the first node 110 broadcasts neighbor discovery information for a registration request to the second node 120, and the second node 120 responds to the discovery information broadcast from the first node 110.

A neighbor list is displayed on a user interface 3110A of the first node 110 (step 1410). The user of the first node 110 may select all neighbor nodes (Anyone) without selecting a specific node from the displayed neighbor list (step 1411, 1510 of (a) of FIG. 15A). In response to a user input, the application layer 320A generates application layer information (1412). For example, the application layer information may include a relay acceptance/rejection indicator value (Relaying OK=YES) and a hop limit (Hop limit=2). The application layer 320A transmits the generated application layer information to an IP layer 330A and a MAC layer 340A (step 1413). The application layer information is processed in the JP layer 330A, the MAC layer 340A and a physical layer (not illustrated), and is transmitted as neighbor discovery information from the first node 110 to the second node 120 to make a registration request (step 1414).

The neighbor discovery information is received by a MAC layer 340B and an IP layer 330B through a physical layer (not illustrated) of the second node 120 (step 1415). Thereafter, the neighbor discovery information is received by an application layer 320B (step 1416). The application layer 320B transmits a registration request message included in the received discovery information to the user interface (step 1417). A user interface 310B displays the registration request message received from the first node 110 (step 1420, 1530 of (d) of FIG. 15A). Also, a user interface 310B displays information for inquiring whether to relay the received discovery information to other neighbor nodes (1540 of (d) of FIG. 15A). A neighbor list is displayed on the user interface 310B ((b) of FIG. 15A). Herein, the registration of the first node 110 in the second node 120 is confirmed.

The application layer 320B confirms the registration of the first node 110 (step 1421), and generates application layer information indicating this. The application layer information is processed in the IP layer 330B, the MAC layer 340B and a physical layer (not illustrated), and is transmitted as a response message with respect to the registration request to the first node 110 (step 1422).

The registration request response message is received by the MAC layer 340A and the IP layer 330A through a physical layer (not illustrated) of the first node 110. The MAC layer 340A and the IP layer 330A confirm the state "YES" of the second node 120 according to the registration request response message, and transmit the fact to the application layer 320A. The application layer 320A receives state information of the second node 120, and displays a neighbor list, which indicates the connection (registration) of the second node 120, on the user interface 310A (step 1424, (a) of FIG. 15A).

The process flow illustrated in FIG. 14B illustrates an example of the case where the second node 120 relays the discovery information to the third node 130 in response to the discovery information broadcast from the first node 110, and the third nodes 130 responds to the discovery information broadcast from the second node 120.

A user interface 310B of the second node 120 displays the registration request message received from the first node 110 (step 1420, 1530 of (d) of FIG. 15A), and displays information for inquiring whether to relay the received discovery information to other neighbor nodes (1540 of (d) of FIG. 15A).

When the user of the second node 120 selects the relay of the discovery information through the user interface 310B, the application layer 320B generates application layer information in response to a user input (1431). For example, the application layer information may include a relay acceptance/rejection indicator value (Relaying OK=YES) and a hop limit (Hop limit=1). Herein, the hop limit is smaller by 1 than the hop limit included in the discovery information received from the first node 110. That is, the application layer 320B decreases the hop limit, included in the received discovery information, by one. The application layer 320B transmits the generated application layer information to an IP layer 330B and a MAC layer 340B (step 1432). The application layer information is processed in the IP layer 330B, the MAC layer 340B and a physical layer (not illustrated), and is transmitted as neighbor discovery information from the second node 120 to the third node 130 to make a registration request (step 1433).

The neighbor discovery information is received by a MAC layer 340C and an IP layer 330C through a physical layer (not illustrated) of the third node 130 (step 1434). Thereafter, the neighbor discovery information is received by an application layer 320C (step 1435). The application layer 320C transmits a registration request message included in the received discovery information to the user interface (step 1436). A user interface 310C displays the registration request message received from the first node 110 (step 1440, 1550 of (a) of FIG. 15B). Also, a neighbor list is displayed on the user interface 310C ((c) of FIG. 15A). Herein, the non-registration of the first node 110 in the third node 130 is confirmed, and the registration of the second node 120 is confirmed.

When the user of the third node 130 selects the registration of the first node 110 (1520 of (c) of FIG. 15A), the application layer 320C confirms the first node 110 having requested registration, and generates application layer information indicating registration acceptance. The application layer information is processed in the IP layer 330C, the MAC layer 340C and a physical layer (not illustrated), and is transmitted as a response message with respect to the registration request to the first node 110.

On the other hand, the application layer 320C confirms the registration of the second node 120 (step 1441), and generates application layer information corresponding to this. The application layer information is processed in the IP layer 330C, the MAC layer 340C and a physical layer (not illustrated), and is transmitted as a response message to the second node 120 (step 1442).

The response message is received by the MAC layer 340B and the IP layer 330B through a physical layer (not illustrated) of the second node 120. The MAC layer 340B and the IP layer 330B confirm the state "YES" of the third node 130 according to the response message, and transmit the fact to the application layer 320B. The application layer 320B receives state information of the third node 130, and displays a neighbor list, which indicates the connection (registration) of the third node 130, on the user interface 310B (step 1444, (c) of FIG. 15A).

Figure 20B:
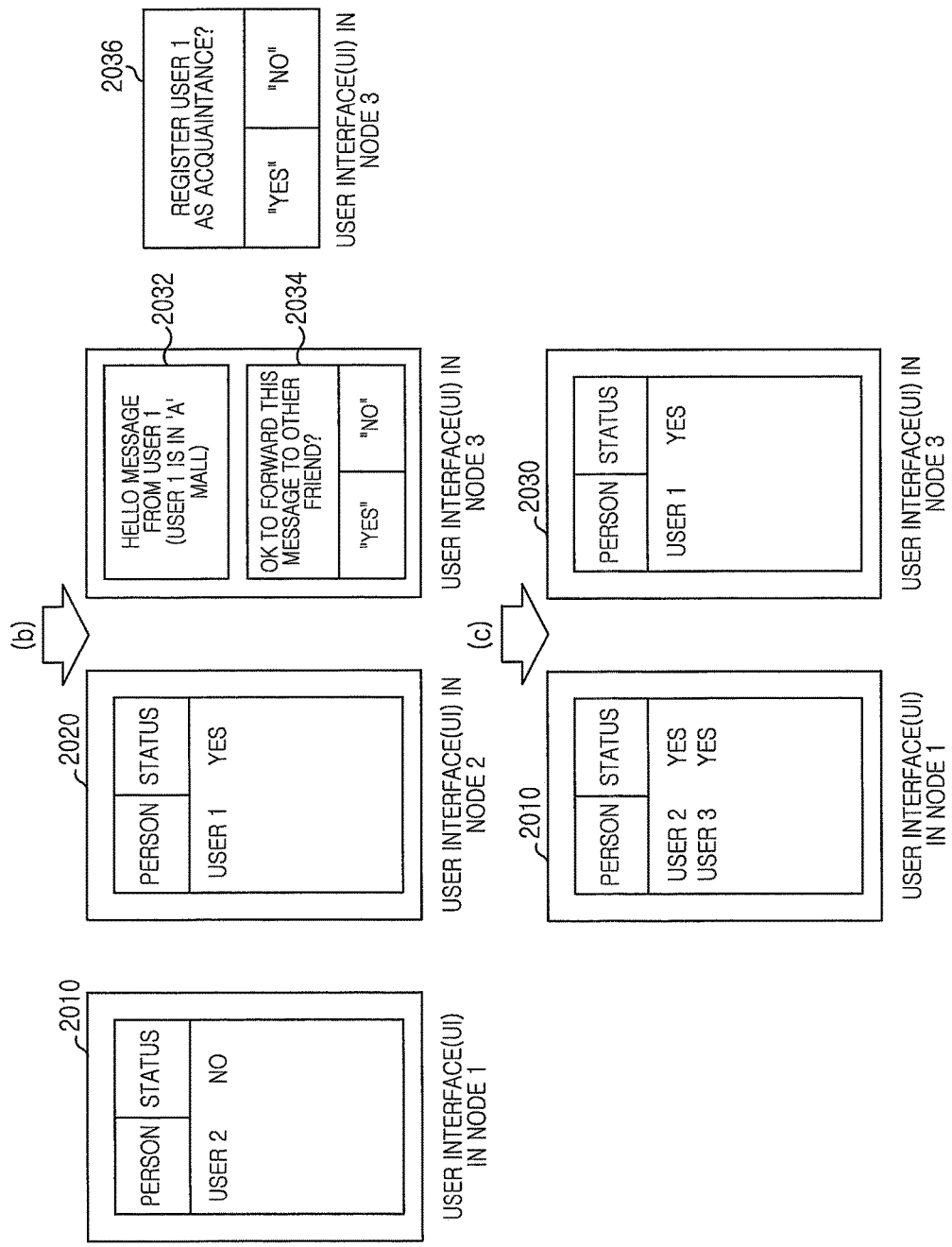

The neighbor discovery operation according to the process flow illustrated in FIGS. 14A and 14B is similarly performed in the case where no neighbor node is registered in the neighbor list as in the example of the user screen illustrated in FIGS. 20A and 20B, as well as in the case where some neighbor nodes are registered in the neighbor list as in the example of the user screen illustrated in FIGS. 15A and 15B.

A neighbor list (2010 of FIG. 20A) and information 2016 for inquiring whether to set a value of the relay acceptance/rejection indicator are displayed on the user interface 310A of the first node 110. The user of the first node 110 may select all neighbor nodes (Anyone) without selecting a specific node from the displayed neighbor list (2012). When the user selects all neighbor nodes, a window 2014 for creating a registration request message is displayed, and the user may input a registration request message through the window 2014. In response to a user input, the application layer 320A generates application layer information. For example, the application layer information may include a relay acceptance/rejection indicator value (Relaying OK=YES) and a hop limit (Hop limit=2). The application layer 320A transmits the generated application layer information to an IP layer 330A and a MAC layer 340A. The application layer information is processed in the IP layer 330A, the MAC layer 340A and a physical layer (not illustrated), and is transmitted as neighbor discovery information from the first node 110 to the second node 120 to make a registration request.

The neighbor discovery information is received by a MAC layer 340B and an IP layer 330B through a physical layer (not illustrated) of the second node 120. Thereafter, the neighbor discovery information is received by an application layer 320B. The application layer 320B transmits a registration request message included in the received discovery information to the user interface 310B. The user interface 310B displays the registration request message received from the first node 110 (2022 of (b) of FIG. 20A). Also, the user interface 310B displays information for inquiring whether to relay the received discovery information to other neighbor nodes (2024). Also, in response to the registration request message, the user interface 310B inquires of the user of the second node whether to register the first node, by displaying information for inquiring whether to register the first node (2026).

When the user of the second node 120 selects the registration of the first node through the user interface 310B, the application layer 320B generates application layer information in response to a user input. The application layer 320B transmits the generated application layer information to an IP layer 330B and a MAC layer 340B. The application layer information is processed in the IP layer 330B, the MAC layer 340B and a physical layer (not illustrated), and is transmitted as a response message with respect to the registration request from the second node 120 to the first node 110. According to this processing result, a neighbor list indicating the registration of the second node 120 is displayed on the user interface 310A of the first node 110 (2010 of (c) of FIG. 20B), and a neighbor list indicating the registration of first node 110 is displayed on the user interface 310B of the second node 120 (2020).

Also, when the user of the second node 120 selects the relay of the discovery information through the user interface 310B (2024), application layer information corresponding to this is generated. For example, the application layer information may include a relay acceptance/rejection indicator value (Relaying OK=YES) and a hop limit (Hop limit=1). Herein, the hop limit is smaller by 1 than the hop limit included in the discovery information received from the first node 110. That is, the application layer 320B decreases the hop limit, included in the received discovery information, by one. The application layer 320B transmits the generated application layer information to an IP layer 330B and a MAC layer 340B (step 1432). The application layer information is processed in the IP layer 330B, the MAC layer 340B and a physical layer (not illustrated), and is transmitted as neighbor discovery information from the second node 120 to the third node 130 to make a registration request.

The neighbor discovery information is received by a MAC layer 340C and an IP layer 330C through a physical layer (not illustrated) of the third node 130. Thereafter, the neighbor discovery information is received by an application layer 320C. The application layer 320C transmits a registration request message included in the received discovery information to the user interface. A user interface 310C displays the registration request message received from the first node 110 (2032 of (c) of FIG. 20B). Also, the user interface 310B displays information for inquiring whether to relay the received discovery information to other neighbor nodes (2034). Also, in response to the registration request message, the user interface 310C inquires of the user of the third node whether to register the first node, by displaying information for inquiring whether to register the first node (2036).

When the user of the third node 130 selects the registration of the first node through the user interface 310C, the application layer 320C generates application layer information in response to a user input. The application layer 320C transmits the generated application layer information to an IP layer 330C and a MAC layer 340C. The application layer information is processed in the IP layer 330C, the MAC layer 340C and a physical layer (not illustrated), and is transmitted as a response message with respect to the registration request from the third node 130 to the first node 110. According to this processing result, a neighbor list indicating the registration of the third node 130 is displayed on the user interface 310A of the first node 110 (2010 of (d) of FIG. 20B), and a neighbor list indicating the registration of first node 110 is displayed on the user interface 310C of the third node 130 (2030).

FIGS. 16 to 19 illustrate example of process flows of neighbor discovery operations according to embodiments of the present disclosure.

Figure 16:
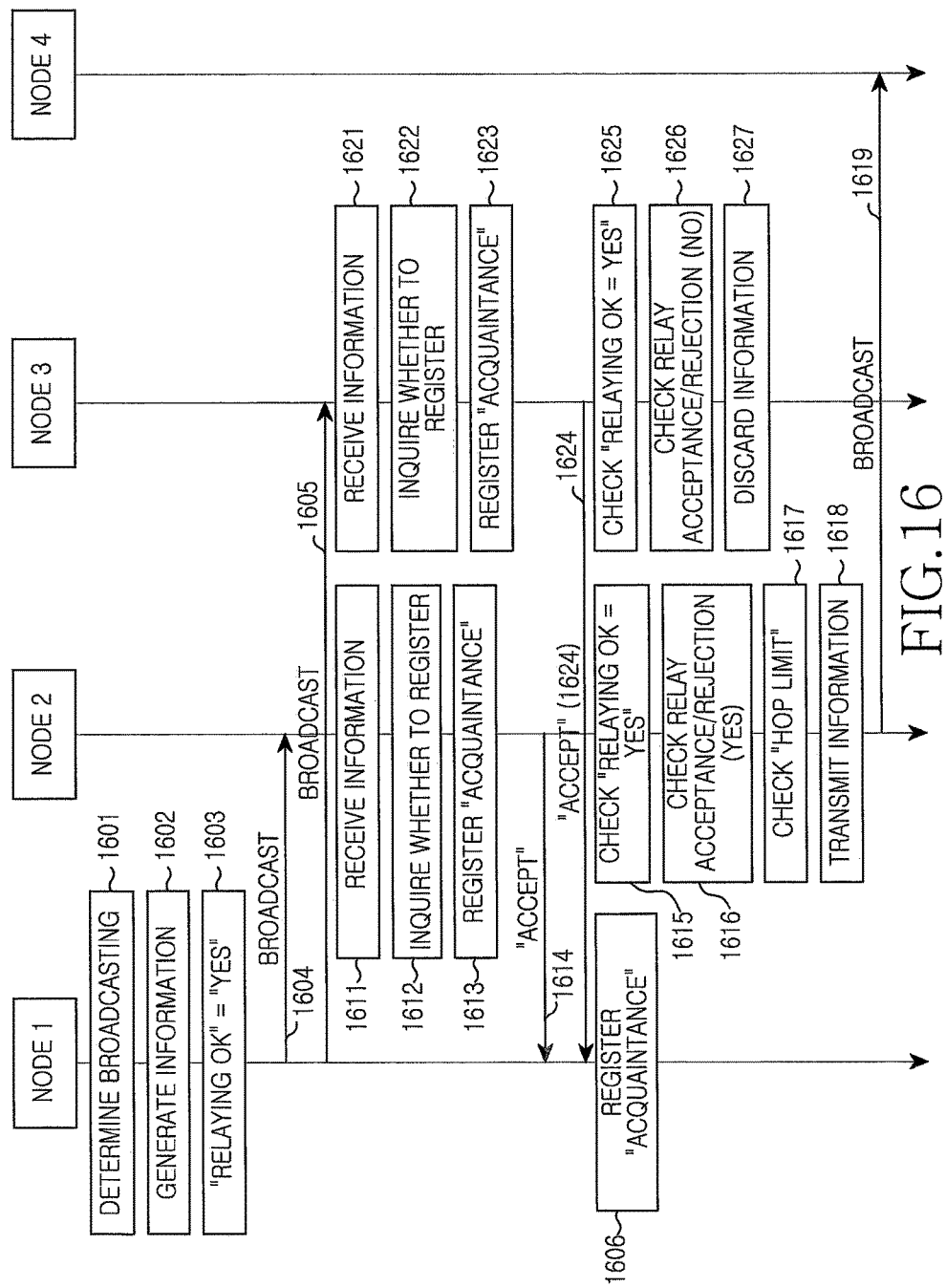
FIGS. 16 to 19 illustrate process flows of neighbor discovery operations according to embodiments of the present disclosure.

FIG. 16 illustrates an example in which the first node broadcasts the discovery information to the second node and the third node, the second node relays the discovery information received from the first node to a fourth node, and the second node and the third node accept the registration request of the first node. The first node determines the broadcast of discovery information for a registration request (step 1601), generates discovery information (step 1602), and sets a value of the relay acceptance/rejection indicator to accept the relay of the discovery information ("Relaying OK=YES") (step 1603).

The second node receives the discovery information broadcast from the first node (step 1611), inquires of the user about the registration/non-registration of the first node by displaying a registration request message (step 1612), registers the first node as "acquaintance" when the user selects the registration (step 1613), and notifies the acceptance of the registration to the first node (step 1614).

The third node receives the discovery information broadcast from the first node (step 1621), inquires of the user about the registration/non-registration of the first node by displaying a registration request message (step 1622), registers the first node as "acquaintance" when the user selects the registration (step 1623), and notifies the acceptance of the registration to the first node (step 1624).

The first node receives the acceptance of the registration request from the second node and the third node, and registers the second node and the third node as "acquaintance" (step 1606).

When the value of the relay acceptance/rejection indicator included in the discovery information broadcast from the first node ("Relaying OK=YES") is checked (step 1615), the registration request message and the information for inquiring whether to relay the discovery information are displayed on the user interface of the second node, whether the user selects the relay of the discovery information from the inquiry information ("YES") is checked (step 1616), and the hop limit included in the discovery information is checked (step 1617). When the relay of the discovery information is selected, the application layer receives information corresponding to this (step 1618), and broadcasts the generated discovery information to the adjacent fourth node (step 1619).

When the value of the relay acceptance/rejection indicator included in the discovery information broadcast from the first node ("Relaying OK=YES") is checked (step 1625), the registration request message and the information for inquiring whether to relay the discovery information are displayed on the user interface of the third node, and whether the user selects the relay of the discovery information from the inquiry information is checked (step 1626). When the relay of the discovery information is not selected ("NO"), the discovery information is discarded (step 1627).

Although not illustrated in detail, the fourth node performs the same operation as the second node or the third node according to the received discovery information.

Figure 17:
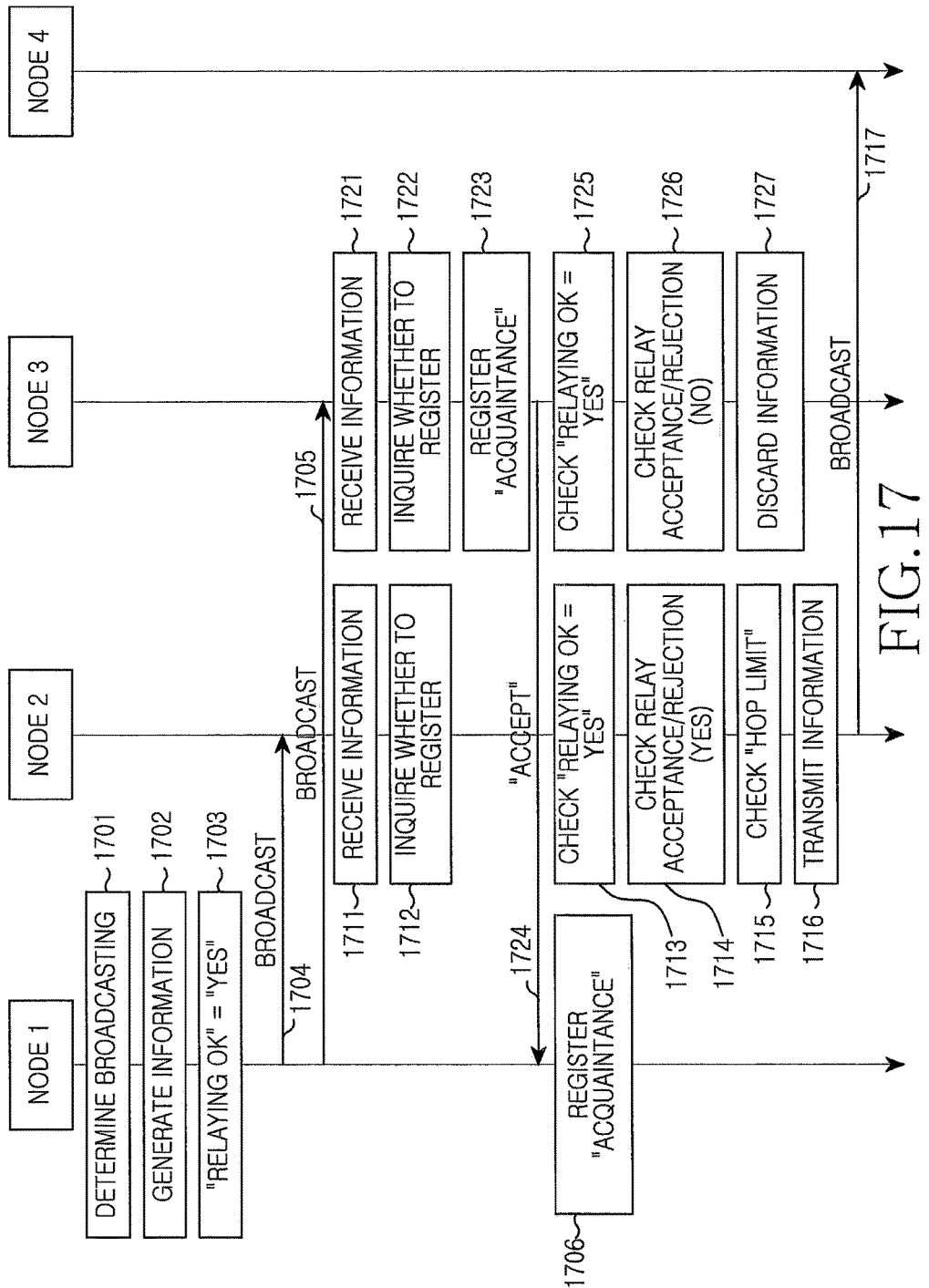

FIG. 17 illustrates an example in which the first node broadcasts the discovery information to the second node and the third node, the second node relays the discovery information received from the first node to a fourth node, and the third node accepts the registration request of the first node. The first node determines the broadcast of discovery information for a registration request (step 1701), generates discovery information (step 1702), and sets a value of the relay acceptance/rejection indicator to accept the relay of the discovery information ("Relaying OK=YES") (step 1703). The first node broadcasts the generated discovery information to the adjacent first node and the adjacent third node (steps 1704 and 1705)

The second node receives the discovery information broadcast from the first node (step 1711), and inquires of the user about the registration/non-registration of the first node by displaying a registration request message (step 1712).

The third node receives the discovery information broadcast from the first node (step 1721), inquires of the user about the registration/non-registration of the first node by displaying a registration request message (step 1722), registers the first node as "acquaintance" when the user selects the registration (step 1723), and notifies the acceptance of the registration to the first node (step 1724).

The first node receives the acceptance of the registration request from the third node, and registers the third node as "acquaintance" (step 1706).

When the value of the relay acceptance/rejection indicator included in the discovery information broadcast from the first node ("Relaying OK=YES") is checked (step 1713), the registration request message and the information for inquiring whether to relay the discovery information are displayed on the user interface of the second node, whether the user selects the relay of the discovery information from the inquiry information ("YES") is checked (step 1714), and the hop limit included in the discovery information is checked (step 1715). When the relay of the discovery information is selected, the application layer receives information corresponding to this (step 1716), and broadcasts the generated discovery information to the adjacent fourth node (step 1717).

When the value of the relay acceptance/rejection indicator included in the discovery information broadcast from the first node ("Relaying OK=YES") is checked (step 1725), the registration request message and the information for inquiring whether to relay the discovery information are displayed on the user interface of the third node, and whether the user selects the relay of the discovery information from the inquiry information is checked (step 1726). When the relay of the discovery information is not selected ("NO"), the discovery information is discarded (step 1727).

Although not illustrated in detail, the fourth node performs the same operation as the second node or the third node according to the received discovery information.

Figure 18:
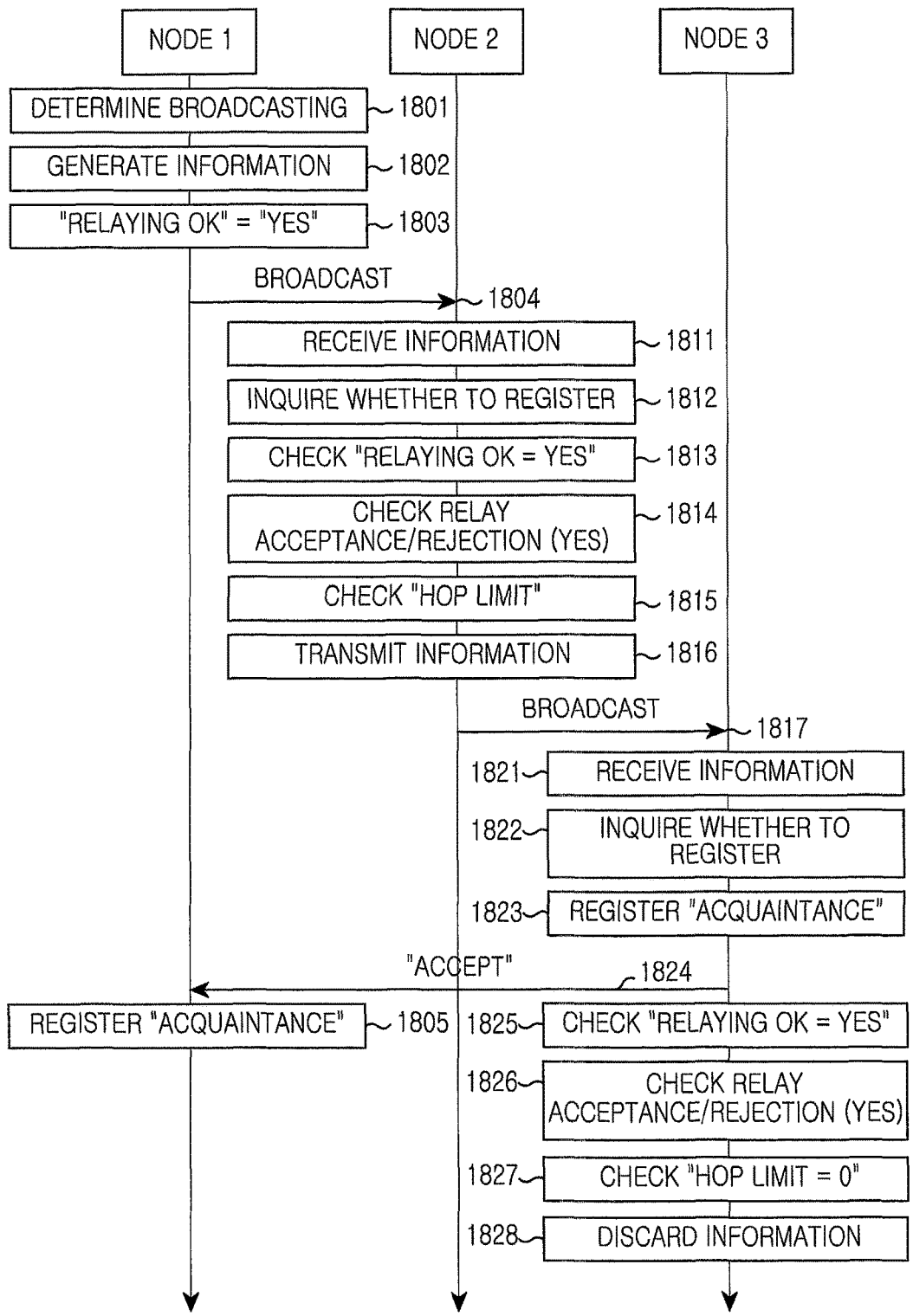

FIG. 18 illustrates an example in which the first node broadcasts the discovery information to the second node, the second node relays the discovery information received from the first node to the third node, and the third node accepts the registration request of the first node. The first node determines the broadcast of discovery information for a registration request (step 1801), generates discovery information (step 1802), and sets a value of the relay acceptance/rejection indicator to accept the relay of the discovery information ("Relaying OK=YES") (step 1803). The first node broadcasts the generated discovery information to the adjacent second node (step 1804)

The second node receives the discovery information broadcast from the first node (step 1811), and inquires of the user about the registration/non-registration of the first node by displaying a registration request message (step 1812). When the value of the relay acceptance/rejection indicator included in the discovery information broadcast from the first node ("Relaying OK=YES") is checked (step 1813), the registration request message and the information for inquiring whether to relay the discovery information are displayed on the user interface of the second node, whether the user selects the relay of the discovery information from the inquiry information ("YES") is checked (step 1814), and the hop limit included in the discovery information is checked (step 1815). When the relay of the discovery information is selected, the application layer receives information corresponding to this (step 1816), and broadcasts the generated discovery information to the adjacent third node (step 1817).

The third node receives the discovery information relayed from the second node (step 1821), inquires of the user about the registration/non-registration of the first node by displaying a registration request message (step 1822), registers the first node as "acquaintance" when the user selects the registration (step 1823), and notifies the acceptance of the registration to the first node (step 1824).

The first node receives the acceptance of the registration request from the third node, and registers the third node as "acquaintance" (step 1805).

When the value of the relay acceptance/rejection indicator included in the discovery information broadcast from the second node ("Relaying OK=YES") is checked (step 1825), the registration request message and the information for inquiring whether to relay the discovery information are displayed on the user interface of the third node, whether the user selects the relay of the discovery information from the inquiry information ("YES") is checked (step 1826), and the hop limit included in the discovery information is checked (step 1827). When the hop limit is zero (0), the discovery information is discarded (step 1828).

Figure 19:
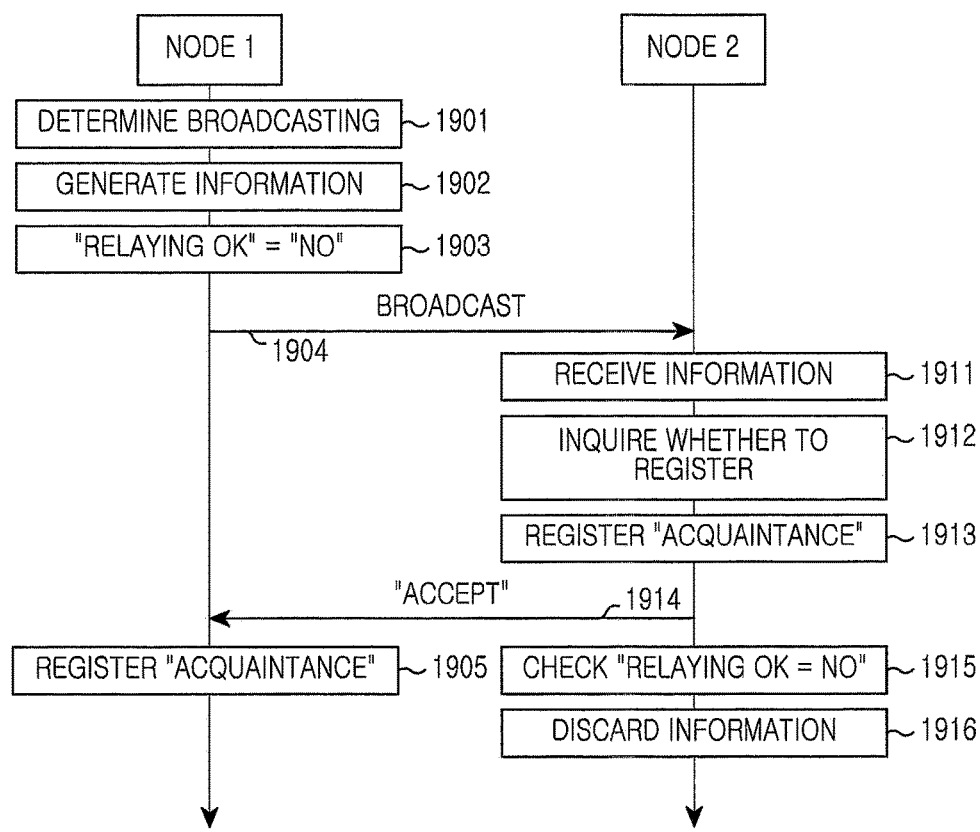

FIG. 19 illustrates an example in which the first node broadcasts the discovery information to the second node, and the second node accepts the registration request of the first node. The first node determines the broadcast of discovery information for a registration request (step 1901), generates discovery information (step 1902), and sets a value of the relay acceptance/rejection indicator to accept the relay of the discovery information ("Relaying OK=NO") (step 1903). The first node broadcasts the generated discovery information to the adjacent second node (step 1904)

The second node receives the discovery information broadcast from the first node (step 1911), and inquires of the user about the registration/non-registration of the first node by displaying a registration request message (step 1912). When the user selects the registration, the second node registers the first node as "acquaintance" (step 1913), and notifies the acceptance of the registration to the first node (step 1914).

The application layer checks a value of the relay acceptance/rejection indicator included in the discovery information broadcast from the first node (step 1915). Since the value of the relay acceptance/rejection indicator is "NO", the discovery information is discarded (step 1916).

As described above, the neighbor discovery operation according to the embodiments of the present disclosure extends the range of a wireless communication network by relaying the discovery information to adjacent nodes, instead of discovering all nodes to be registered in the source node. In this case, since most of the discovery information is processed through cooperation between the application layer and the MAC layer (particularly in the application layer), it is possible to support the adjacent network while minimizing a change in the physical layer and the MAC layer. The embodiments of the present disclosure can be applied not only to a Wi-Fi network but also to a D2D or P2P wireless communication network.

While the disclosure has been shown and described with reference to certain exemplary embodiments thereof, it will be understood by those skilled in the art that various changes in form and details may be made therein without departing from the spirit and scope of the disclosure as defined by the appended claims. For example, the operation according to the embodiment of the present disclosure may be recorded in a computer-readable recording medium including a computer command for performing an operation implemented by various computers. The computer-readable recording medium may include program commands, data tiles, and data structures in singularity or in combination. The program commands may be those that are especially designed and configured for the present disclosure, or may be those that are publicly known and available to those skilled in the art. Examples of the computer-readable recording medium include magnetic recording media such as hard disks, floppy disks and magnetic tapes, optical recording media such as CD-ROMs and DVDs, magneto-optical recording mediums such as floptical disks, and hardware devices such as ROMs, RAMs and flash memories that are especially configured to store and execute program commands. Examples of the program commands include machine language codes created by a compiler, and high-level language codes that can be executed by a computer by using an interpreter. When all or some of a base station or a relay described in the present disclosure is implemented by a computer program, a computer-readable recording medium storing the computer program is also included in the present disclosure. Therefore, the scope of the disclosure is defined not by the detailed description of the disclosure but by the appended claims, and all differences within the scope will be construed as being included in the present disclosure.

What is claimed is:

1. A method for operating a second node to discover neighboring nodes in a wireless communication, the method comprising:
   receiving, from a first node, first discovery information including awareness information, hop information indicating a hop limit corresponding to a number of available relays, and indication information indicating whether to allow a relay;
   displaying a first user interface (UI) for determining whether to register the first node according to the awareness information;
   in response to detecting a first user input on the first UI, transmitting, to the first node, a response message for indicating that the second node registers the first node;
   when the indication information indicates allowance of the relay and the hop limit is greater than or equal to 1, displaying a second UI for determining whether to transmit second discovery information to a third node;
   in response to detecting a second user input on the second UI, generating the second discovery information based on the first discovery information; and
   transmitting the generated second discovery information to the third node,
   wherein generating the second discovery information comprises:
      generating application layer information including the awareness information, the indication information, and another hop information indicating a hop limit smaller by one than the hop limit included in the first discovery information on an application layer according to the second user input detected on the second UI; and
      generating the second discovery information as a medium access control (MAC) layer packet by adding a MAC header and an internet protocol (IP) header to the application layer information, and
      wherein the generated second discovery information is transmitted to the third node on the MAC layer with a physical layer processing.

2. The method of claim 1, wherein the first discovery information further includes information for the first node and information for one or more target nodes, and
   wherein the indication information is set by a user input obtained at the first node.

3. The method of claim 1, further comprising:
   if the indication information does not indicate to allow the relay, discarding the received first discovery information.

4. The method of claim 3, further comprising:
   in response to detecting a third user input different from the first user input on the first UI, transmitting, to the first node, a response message for indicating that the second node does not register the first node; and
   in response to detecting a fourth user input different from the second user input on the second UI, discarding the received first discovery information.

5. The method of claim 1, wherein the awareness information is processed on an application layer to display the first UI, and
   wherein the indication information and the hop information are processed on the application layer to display the second UI.

6. An apparatus of a second node to discover neighboring nodes, the apparatus comprising:
   at least one transceiver; and
   at least one processor operatively coupled to the at least one transceiver, and configured to:
   receive, from a first node, first discovery information including awareness information, a hop information indicating a hop limit corresponding to a number of available relays of the first discovery information, and indication information indicating whether to allow a relay,
   display a first user interface (UI) for determining whether to register the first node according to the awareness information, in response to detecting a first user input on the first UI, transmit, to the first node, a response message for indicating that the second node registers the first node, when the indication information indicates allowance of the relay, display a second UI for determining whether to transmit second discovery information to a third node, in response to detecting a second user input on the second UI, generate the second discovery information based on the first discovery information, and transmit the generated second discovery information to the third node, wherein the at least one processor is, in order to generate the second discovery information, configured to:

generate application layer information including the awareness information, the indication information, and another hop information indicating a hop limit smaller by one than the hop limit included in the first discovery information on an application layer according to the second input detected on the second UI; and generate the second discovery information as a medium access control (MAC) layer packet by adding a MAC header and an internet protocol (IP) header to the application layer information, and wherein the generated second discovery information is transmitted to the third node on the MAC layer with a physical layer processing.

7. The apparatus of claim 6, wherein the first discovery information further includes information for the first node and information for one or more target nodes, and wherein the indication information is set by a user input obtained at the first node.

8. The apparatus of claim 6, wherein the at least one processor is further configured to:

if the indication information does not indicate to allow the relay, discard the received first discovery information.

9. The apparatus of claim 8, wherein the at least one processor is further configured to:

in response to detecting a third user input different from the first user input on the first UI, transmit, to the first node, a response message for indicating that the second node does not register the first node; and in response to detecting a fourth user input different from the second user input on the second UI, discard the received first discovery information.

10. The apparatus of claim 6, wherein the awareness information is processed on an application layer to display the first UI, and wherein the indication information and the hop information are processed on the application layer to display the second UI.

* * * * *